(12) United States Patent
Kim et al.

(10) Patent No.: US 12,506,745 B2
(45) Date of Patent: Dec. 23, 2025

(54) ELECTRONIC DEVICE AND CONTROL METHOD THEREFOR

(71) Applicant: Samsung Electronics Co., Ltd., Suwon-si (KR)

(72) Inventors: Jeongmin Kim, Suwon-si (KR); Junghyun Kim, Suwon-si (KR); Junsun Park, Suwon-si (KR); Jonghoon Lee, Suwon-si (KR); Sihak Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 304 days.

(21) Appl. No.: 18/297,894

(22) Filed: Apr. 10, 2023

(65) Prior Publication Data

US 2023/0244771 A1    Aug. 3, 2023

Related U.S. Application Data

(63) Continuation of application No. PCT/KR2021/002368, filed on Feb. 25, 2021.

(30) Foreign Application Priority Data

Jan. 26, 2021    (KR) .................. 10-2021-0011001

(51) Int. Cl.
  *H04L 9/40*    (2022.01)
  *H04N 7/14*    (2006.01)

(52) U.S. Cl.
  CPC ........... *H04L 63/123* (2013.01); *H04N 7/141* (2013.01); *H04L 63/0846* (2013.01)

(58) Field of Classification Search
  CPC .... H04L 63/123; H04L 63/0846; H04N 7/141
  See application file for complete search history.

(56) References Cited

U.S. PATENT DOCUMENTS 9,654,981 B2    5/2017    Lazaridis et al.
9,838,360 B2    12/2017    Omar
(Continued)

FOREIGN PATENT DOCUMENTS

JP    2009-239496 A    10/2009
KR    10-0400947 B1    10/2003
(Continued)

OTHER PUBLICATIONS

International Search Report with English translation dated Oct. 6, 2021, issued in International Patent Application No. PCT/KR2021/002368.

(Continued)

*Primary Examiner* — David J Pearson
(74) *Attorney, Agent, or Firm* — Jefferson IP Law, LLP

(57) ABSTRACT

An electronic device is provided. The electronic device includes a memory, a communication module, and a processor which generates first authentication information to store the generated first authentication information in the memory and transmits a video call request and the first authentication information to an external device through the communication module, if a user input for performing a video call with the external device is received, and which generates first image data including second authentication information and transmits the generated first image data to the external device through the communication module, if the second authentication information is received from the external device through the communication module.

14 Claims, 16 Drawing Sheets

(56) References Cited

U.S. PATENT DOCUMENTS

| | | | |
|---|---|---|---|
| 10,228,903 B2 | 3/2019 | Kang et al. | |
| 10,255,441 B2 | 4/2019 | Jung et al. | |
| 10,674,009 B1* | 6/2020 | Jakobsson | H04M 3/42042 |
| 10,986,226 B1* | 4/2021 | Krebs | H04M 3/42042 |
| 11,245,867 B2 | 2/2022 | Shih et al. | |
| 2012/0180115 A1* | 7/2012 | Maitland | G09C 5/00 |
| | | | 726/7 |
| 2014/0132994 A1 | 5/2014 | Calhoon et al. | |
| 2015/0003608 A1* | 1/2015 | Ansari | H04N 7/147 |
| | | | 380/201 |
| 2015/0254436 A1* | 9/2015 | Lee | G06F 21/606 |
| | | | 726/26 |
| 2015/0287416 A1* | 10/2015 | Brands | H04L 9/3231 |
| | | | 704/273 |
| 2020/0195778 A1* | 6/2020 | Tang | H04M 3/4365 |
| 2020/0219221 A1 | 7/2020 | Malone | |
| 2020/0267404 A1* | 8/2020 | Levy | H04N 21/8358 |
| 2021/0097966 A1* | 4/2021 | Jansson | H04S 1/007 |
| 2021/0150016 A1 | 5/2021 | Miyamoto et al. | |
| 2021/0329005 A1* | 10/2021 | Locke | H04L 63/1475 |
| 2022/0272131 A1 | 8/2022 | Jun et al. | |

FOREIGN PATENT DOCUMENTS

| | | |
|---|---|---|
| KR | 10-0789668 B1 | 12/2007 |
| KR | 10-2015-0010517 A | 1/2015 |
| KR | 10-1680975 B1 | 12/2016 |
| KR | 10-2017-0029244 A | 3/2017 |
| KR | 10-2022-0071258 A | 5/2022 |
| KR | 10-2022-0105875 A | 7/2022 |
| WO | 2013/104027 A1 | 7/2013 |

OTHER PUBLICATIONS

Korean Office Action with English translation dated Jun. 30, 2025; Korean Appln. No. 10-2021-0011001.

* cited by examiner

FIG. 1
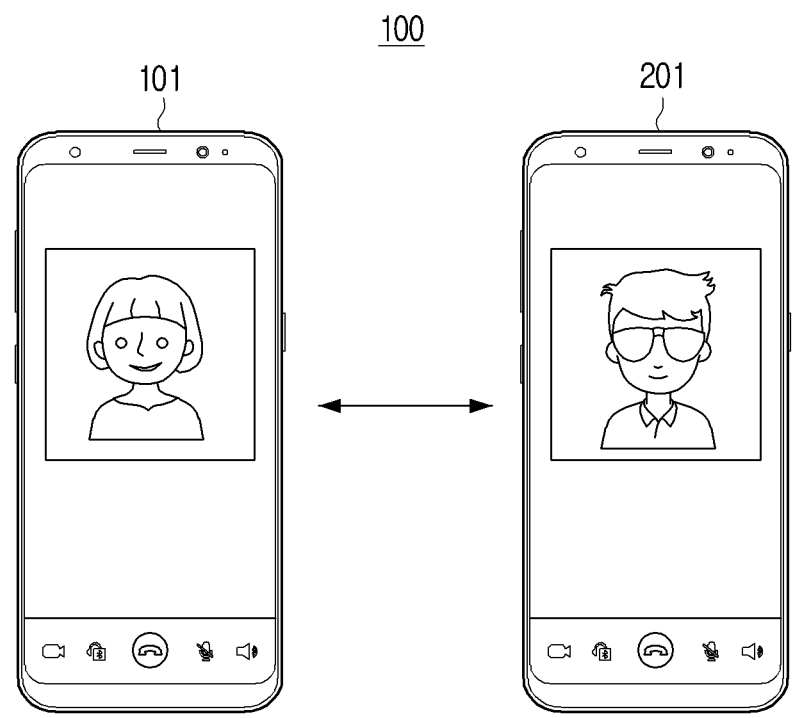
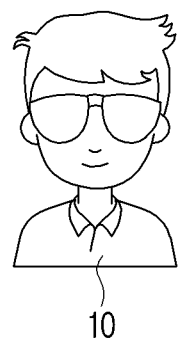
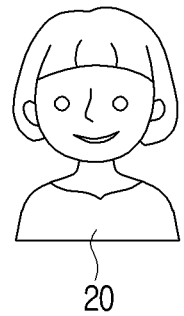

FIG. 10
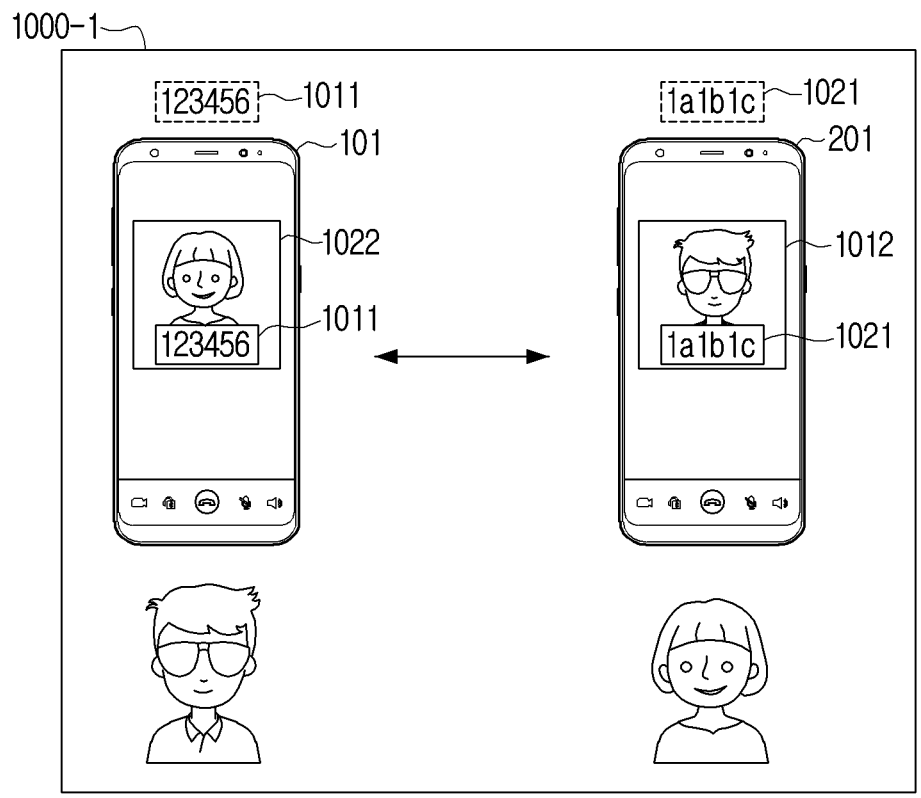
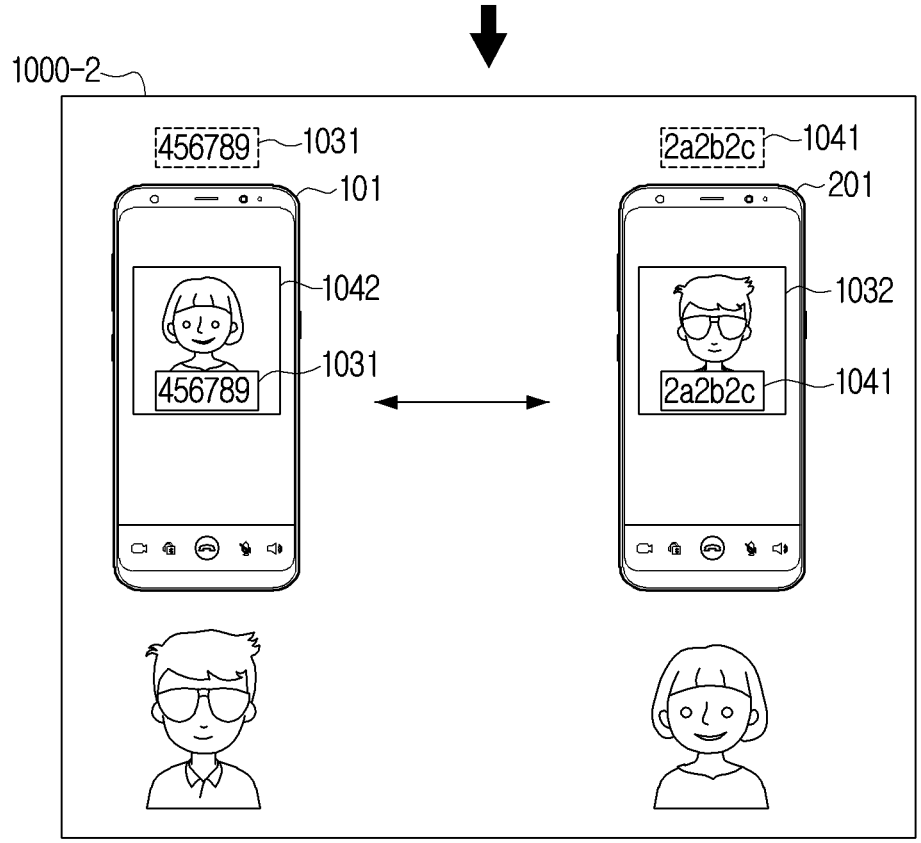

ELECTRONIC DEVICE AND CONTROL METHOD THEREFOR

CROSS-REFERENCE TO RELATED APPLICATION(S)

This application is a continuation application, claiming priority under § 365(c), of an International application No. PCT/KR2021/002368, filed on Feb. 25, 2021, which is based on and claims the benefit of a Korean patent application number 10-2021-0011001, filed on Jan. 26, 2021, in the Korean Intellectual Property Office, the disclosure of which is incorporated by reference herein in its entirety.

BACKGROUND

1. Field

The disclosure relates to an electronic device and a control method therefor. More particularly, the disclosure relates to an electronic device that verifies data received in performing a video call, and a control method therefor.

2. Description of Related Art

In performing a video call by a live streaming method, there may be an attempt to manipulate an image or audio. Recently, with the development of artificial intelligence (AI) technologies, technologies for modulating images and sounds are developing. Along with this, attempts to forge or modulate an image or audio used in a video call are increasing.

In case a hacker hacks a video call by modulation of an image and sounds, such hacking may be applied to criminal acts in various forms such as a fishing crime, etc.

In the past, mutual data integrity was authenticated by a method of directly photographing a clock or an object promised between users on a camera used in a video call. However, such a method has a problem that the possibility of manipulating the original screen itself cannot be excluded, and thus security is low.

Also, in the past, a management server distributed common authentication keys to users of a video call, and the users authenticated data integrity by exchanging the common authentication keys with one another. However, such a method has a problem that it is not possible to counteract in case an image or a sound input through streaming feed itself was modulated, and also, there is a problem that the traffic increases.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device that generates image data including authentication information acquired from a counterpart of a video call and transmitting the data to the counterpart, and a control method therefor.

Additional aspects will be set forth in part in the description which follows and, in part, will be apparent from the description, or may be learned by practice of the presented embodiments.

In accordance with an aspect of the disclosure, an electronic device is provided. The electronic device includes a memory, a communication module, and a processor configured to, based on receiving a user input for performing a video call with an external device, generate first authentication information and store the generated first authentication information in the memory, transmit a video call request and the first authentication information to the external device through the communication module, and based on receiving second authentication information from the external device through the communication module, generate first image data including the second authentication information, and transmit the generated first image data to the external device through the communication module.

Meanwhile, the processor may, based on receiving second image data from the external device through the communication module, identify authentication information in the second image data, and based on the first authentication information and the authentication information identified in the second image data coinciding, determine that the second image data is authenticated data.

Meanwhile, the processor may generate the first image data including the second authentication information by using a steganography method, and based on a predetermined event occurring, change an algorithm by the steganography method.

Meanwhile, the processor may generate the first authentication information based on time information and device identification information.

Meanwhile, the processor may, based on a predetermined event occurring, change at least one of the time information or the device identification information and generate third authentication information, and store the generated third authentication information in the memory, and transmit the third authentication information instead of the first authentication information to the external device through the communication module.

Meanwhile, the predetermined event may be an event that a predetermined cycle arrives or an event of receiving a user input for regenerating authentication information.

Meanwhile, the electronic device further includes a camera module, and the processor may acquire photographed image information through the camera module, and generate the first image data by combining the acquired photographed image information and the second authentication information.

Meanwhile, the processor may, based on receiving the user input for performing a video call with the external device, generate first audio data including the second authentication information, transmit the generated first audio data to the external device through the communication module, and based on receiving second audio data from the external device through the communication module, identify authentication information in the second audio data, and based on the first authentication information and the authentication information identified in the second audio data coinciding, determine that the second audio data is authenticated data.

Meanwhile, the processor may generate the first audio data including the second authentication information by using a non-audible frequency insertion method, and based on a predetermined event occurring, change an algorithm by the non-audible frequency insertion method.

Meanwhile, the electronic device further includes an audio module, and the processor may acquire voice audio information through the audio module, and generate the first audio data by combining the acquired voice audio information and the second authentication information.

In accordance with another aspect of the disclosure, a control method for an electronic device is provided The control method includes the steps of, based on receiving a user input for performing a video call with an external device, generating first authentication information, transmitting a video call request and the first authentication information to the external device, and based on receiving second authentication information from the external device, generating first image data including the second authentication information, and transmitting the generated first image data to the external device.

Meanwhile, the control method further includes the steps of, based on receiving second image data from the external device, identifying authentication information in the second image data, and based on the first authentication information and the authentication information identified in the second image data coinciding, determining that the second image data is authenticated data.

Meanwhile, in the step of generating the first image data, the first image data including the second authentication information may be generated by using a steganography method, and based on a predetermined event occurring, an algorithm by the steganography method may be changed.

Meanwhile, in the step of generating the first authentication information, the first authentication information may be generated based on time information and device identification information.

Meanwhile, the control method further includes the steps of, based on a predetermined event occurring, changing at least one of the time information or the device identification information and generating third authentication information, and transmitting the third authentication information instead of the first authentication information to the external device.

Meanwhile, the predetermined event may be an event that a predetermined cycle arrives or an event of receiving a user input for regenerating authentication information.

Meanwhile, in the step of generating the first image data, photographed image information may be acquired through the camera module of the electronic device, and the first image data may be generated by combining the acquired photographed image information and the second authentication information.

Meanwhile, the control method further includes the steps of, based on receiving the user input for performing a video call with the external device, generating first audio data including the second authentication information, transmitting the generated first audio data to the external device, and based on receiving second audio data from the external device, identifying authentication information in the second audio data, and based on the first authentication information and the authentication information identified in the second audio data coinciding, determining that the second audio data is authenticated data.

Meanwhile, in the step of generating the first audio data, the first audio data including the second authentication information may be generated by using a non-audible frequency insertion method, and based on a predetermined event occurring, an algorithm by the non-audible frequency insertion method may be changed.

Meanwhile, in the step of generating the first audio data, voice audio information may be acquired through the audio module of the electronic device, and the first audio data may be generated by combining the acquired voice audio information and the second authentication information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a diagram for illustrating a network environment according to an embodiment of the disclosure;

FIG. 10 is a diagram for illustrating the detailed operation in FIG. 9 according to an embodiment of the disclosure;

The same reference numerals are used to represent the same elements throughout the drawings.

DETAILED DESCRIPTION

Figure 2:
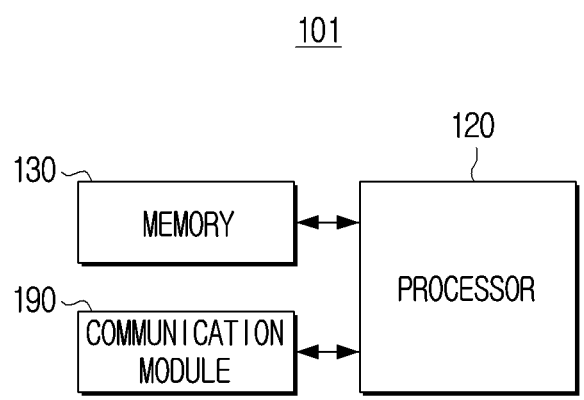
FIG. 2 is a block diagram illustrating an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to the various embodiments described in the disclosure may be devices in various types. An electronic device may include, for example, a portable communication device (e.g.: a smartphone), a computer device, a portable multimedia device, a portable medical device, a camera, a wearable device, or a home appliance. However, an electronic device according to the embodiments of the disclosure is not limited to the aforementioned devices.

Also, in the disclosure, each of the phrases "A or B," "at least one of A and B," "at least one of A or B," "A, B, or C," "at least one of A, B, and C," and "at least one of A, B, or C" may include any one of the items listed together with the corresponding phrase among the phrases, or all possible combinations thereof. In addition, terms such as "first," "second," and the like may be used just to distinguish a component from another component, and are not intended to limit a component in another aspect (e.g.: importance or order). Meanwhile, in case it is mentioned that a component (e.g.: a first component) is "coupled" or "connected" with another component (e.g.: a second component) together with terms such as "functionally" and "communicatively" or without such terms, it means that the component may be connected with the other component directly (e.g.: via wire), wirelessly, or through a third component.

Also, the term "module" used in the various embodiments of the disclosure may include a unit implemented as hardware, software, or firmware, and may be interchangeably used with, for example, terms such as a logic, a logical block, a component, or a circuit. In addition, a module may be a component constituted as an integrated body or a minimum unit or a part of the component performing one or more functions. For example, according to an embodiment, a module is implemented in the form of an application-specific integrated circuit (ASIC).

Further, the various embodiments of the disclosure may be implemented as software (e.g.: a program #40) including at least one instruction stored in a storage medium (e.g.: an internal memory #36 or an external memory #38) that is readable by machines (e.g.: an electronic device #01). For example, a processor (e.g.: a processor #20) of a machine (e.g.: an electronic device #01) calls at least one instruction among at least one instruction stored in a storage medium, and execute the instruction. This enables the machine to be operated to perform at least one function according to the at least one instruction called. The at least one instruction may include a code that is generated by a compiler or a code that can be executed by an interpreter. A storage medium that is readable by machines may be stored in the form of a non-transitory storage medium. Here, the term 'non-transitory' only means that a storage medium is a tangible device, and does not include a signal (e.g.: an electromagnetic wave), and the term does not distinguish a case wherein data is stored in the storage medium semi-permanently and a case wherein data is stored temporarily.

Also, according to an embodiment, the method according to the various embodiments described in the disclosure may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or may be distributed directly between two user devices (e.g.: smartphones), and distributed on-line (e.g.: download or upload) through an application store (e.g.: Play Store™). In the case of on-line distribution, at least a portion of a computer program product may be stored in a storage medium readable by machines such as the server of the manufacturer, the server of the application store, and the memory of the relay server at least temporarily, or may be generated temporarily.

In addition, according to the various embodiments, each component (e.g.: a module or a program) of the aforementioned components may include a singular object or a plurality of objects. Also, some of the plurality of objects may be separately arranged in another component. Further, according to the various embodiments, among the aforementioned corresponding components, one or more components or operations may be omitted, or one or more other components or operations may be added. Alternatively or additionally, a plurality of components (e.g.: modules or programs) may be integrated as one component. In this case, the integrated component may perform one or more functions of each of the plurality of components identically or in a similar manner to how they were performed by the corresponding component among the plurality of components before integration. Also, according to the various embodiments, operations performed by a module, a program, or other components may be executed sequentially, in parallel, repetitively, or heuristically. Or, at least one of the operations may be executed in a different order or omitted, or one or more other operations may be added.

FIG. 1 is a diagram for illustrating a network environment according to an embodiment of the disclosure.

Referring to FIG. 1, the network environment 100 may include an electronic device 101 and an external device 201. Here, the network environment 100 may mean an environment wherein the electronic device 101 and the external device 201 are connected with each other, and a video call service is provided to each device. According to another embodiment, the electronic device 101 and the external device 201 may directly perform communicative connection. According to another embodiment, the electronic device 101 and the external device 201 may be communicatively connected through a separate external server.

Figure 3:
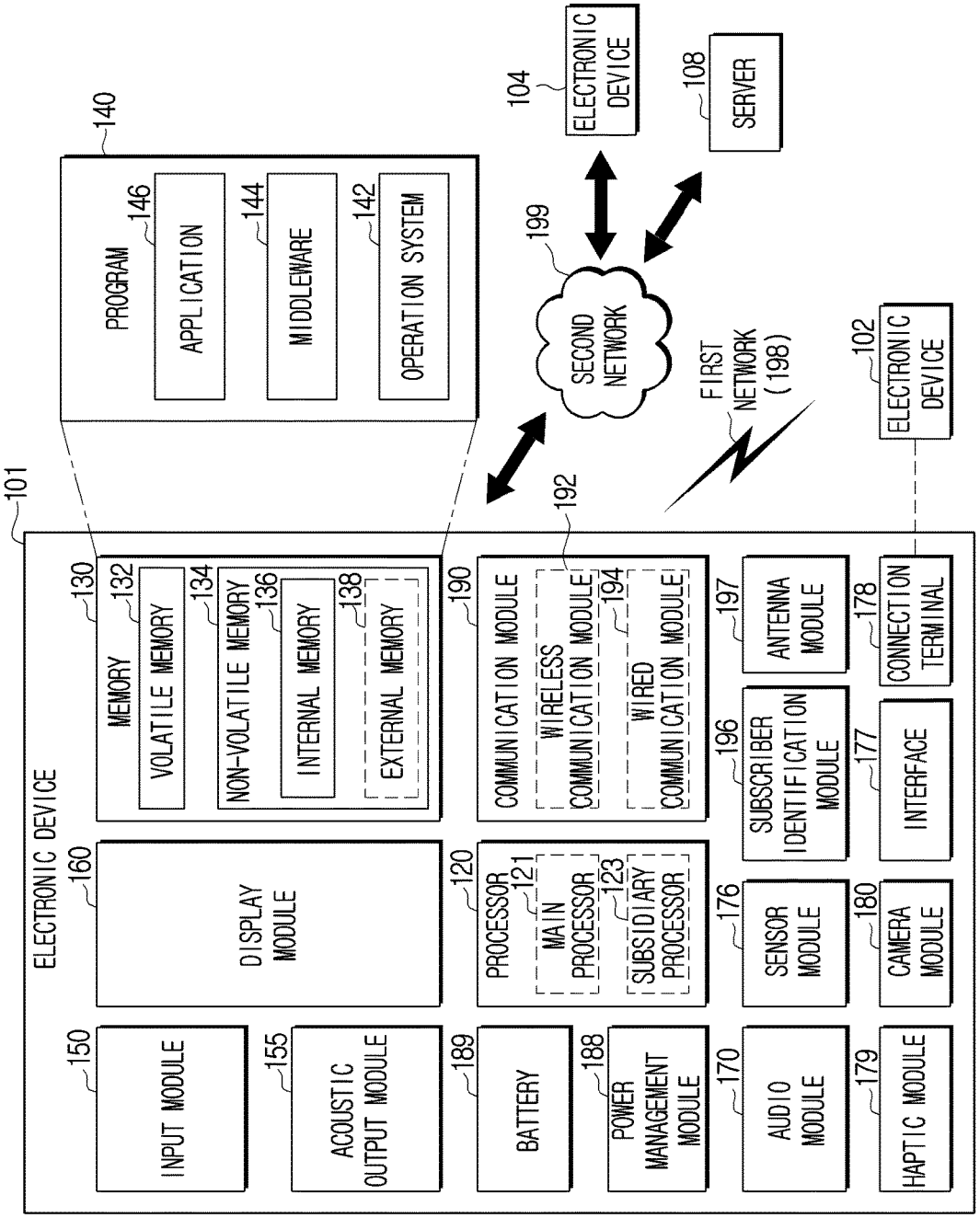
FIG. 3 is a diagram for illustrating a network environment according to an embodiment of the disclosure.

Here, the external device 201 may fall under the electronic device 102 or the electronic device 104 in FIG. 3.

The electronic device 101 may photograph the user 10 of the electronic device 101 and transmit the image to the external device 201, and the external device 201 may photograph the user 20 of the external device 201 and transmit the image to the electronic device 101. The electronic device 101 and the external device 201 may transmit and receive image data with each other, and provide a video call service to each user 10, 20.

Meanwhile, the embodiment in FIG. 1 was described as a form wherein each user 10, 20 is photographed and the images are transmitted in real time, but the video call service can be provided to each user 10, 20 by various methods.

According to yet another embodiment, the electronic device 101 or the external device 201 may provide a service of displaying an image photographed in real time to each user 10, 20.

According to another embodiment, the electronic device 101 or the external device 201 may provide a service of displaying a predetermined image to each user 10, 20. Here, the predetermined image may be a virtual character image, an emoticon, or a prestored image.

FIG. 2 is a block diagram illustrating an electronic device according to an embodiment of the disclosure.

Referring to FIG. 2, the electronic device 101 may include a processor 120, a memory 130, and a communication module 190.

The processor 120 may perform an overall control operation of the electronic device 101. Specifically, the processor 120 performs a function of controlling the overall operations of the electronic device 101. The memory 130 may store information or data used in the various embodiments of the disclosure. The communication module 190 may be a component performing communication with the electronic device 101 and the external device 201.

If a user input for performing a video call with the external device 201 is received, the processor 120 may generate first authentication information and store the generated first authentication information in the memory 130, transmit a video call request and the first authentication information to the external device 201 through the communication module 190, and when second authentication information is received from the external device 201 through the communication module 190, generate first image data including the second authentication information, and transmit the generated first image data to the external device 201 through the communication module 190.

Here, the video call may mean a service of performing communication between different users by using images. Also, the video call may mean an image call or a video conference, etc. According to another embodiment of the disclosure, a video call may be performed by two users. Accordingly, communicative connection between the electronic device 101 and the external device 201 may be performed. A video call according to another embodiment of the disclosure may be performed by three or more users. Another embodiment wherein three users perform a video call will be described later in FIGS. 13 to 15.

Here, the external device 201 may mean a device performing a video call with the electronic device 101. The external device 201 may be connected with the electronic device 101 through a near distance wireless communication network or a long distance wireless communication network.

Here, the user input may be a control instruction for performing a video call with the external device 201. The processor 120 may receive a user input by various methods. As an example, a user input may be selection by the user of the electronic device 101 of a specific user interface (UI) displayed on the display module 160 of the electronic device 101.

Here, the video call request may mean a signal inquiring about whether to perform a video call at a device selected by the user input or a predetermined device.

Here, the device selected by the user input may mean a device that the user selected as the user wished to perform a video call among a plurality of devices. For example, it is assumed that the user of the electronic device 101 selects at least one friend among ten friends through a video call application. Here, the processor 120 may transmit a video call request to the device corresponding to the one friend selected by the user.

Here, the predetermined device may mean a device wherein a general call was already proceeding. Here, the general call may mean a service of performing communication using only audio data without image data. For example, it is assumed that, while the user of the electronic device 101 and the user of the external device 201 were proceeding with a general call, the user of the electronic device 101 input a user input for performing a video call with the external device 201. Here, the processor 120 may transmit a video call request to the external device 201 (the predetermined device) wherein a general call was already being performed.

Here, when the user input for performing a video call is received, the processor 120 may perform communicative connection with the external device 201 corresponding to the user input. Specifically, when the user input for performing a video call is received, the processor 120 may generate a video call request, and transmit the generated video call request to the external device 201. Then, when a video call response corresponding to the video call request is received from the external device 201, the processor 120 may perform communicative connection with the external device 201.

According to an embodiment, when the user input for performing a video call is received, the processor 120 may immediately generate (or acquire) the first authentication information, and transmit the generated first authentication information to the external device 201 together with the video call request.

According to another embodiment, after communicative connection with the external device 201 is performed, the processor 120 may exchange authentication information with the external device 201. Specifically, the processor 120 may generate the first authentication information after communicative connection with the external device 201 is performed, and transmit the generated first authentication information to the external device 201.

However, in the description below, another embodiment wherein the first authentication information is transmitted to the external device 201 together with a video call request will be described.

Here, the first authentication information may mean information used in data verification performed in the electronic device 101. Here, the second authentication information may mean information used in data verification performed in the external device 201.

Here, in performing a video call, the electronic device 101 and the external device 201 may be set to transmit image data including authentication information received from the counterpart.

Here, the processor 120 may receive second authentication information from the external device 201, and generate first image data including the received second authentication information. Then, the processor 120 may transmit the generated first image data to the external device 201.

Specifically, the processor 120 may combine (or synthesize) image information and the second authentication information received from the external device 201, and generate the first image data. Here, the image information may mean a predetermined image or an image photographed in real time.

Here, the predetermined image may be a virtual character image, an emoticon, or a prestored image. For example, the electronic device 101 transmits a scenery photo, etc. to the external device 201 so that the user of the electronic device 101 can hide his or her face, and the external device 201 may display the scenery photo received from the electronic device 101 on the display module of the external device 201. Also, an image photographed in real time may mean an image acquired by the camera module 180 while performing a video call. For example, the camera module 180 of the electronic device 101 photographs the user of the electronic device 101 while a video call is being performed, and the electronic device 101 may transmit the photographed image wherein the user of the electronic device 101 was photographed to the external device 201. Then, the external device 201 may display the photographed image received from the electronic device 101 on the display module of the external device 201.

Here, the processor 120 may generate the first authentication information, and transmit the generated first authentication information to the external device 201. The external device 201 may generate second image data including the first authentication information received from the electronic device 101. Then, the external device 201 may transmit the generated second image data to the electronic device 101.

Meanwhile, when the second image data is received from the external device 201 through the communication module 190, the processor 120 may identify authentication information in the second image data, and if the first authentication information and the authentication information identified in the second image data coincide, the processor 120 may determine (or identify) that the second image data is authenticated data.

Here, in case the electronic device 101 performs a video call with the external device 201, the image data used in the video call may be forged or modulated by a third party, and thus there is a need to verity the integrity of the image data received at the electronic device 101. Accordingly, the processor 120 may generate the first authentication information and transmit the information to the external device 201, and the external device 201 may generate the second image data including the first authentication information and transmit the data to the electronic device 101. Here, the processor 120 may identify (or acquire) the authentication information in the received second image data. Then, the processor 120 may identify (or determine) whether the authentication information identified in the second image data coincides with the first authentication information that the processor 120 directly generated.

If the authentication information identified in the second image data is identical to the first authentication information that the processor 120 directly generated, the processor 120 may determine that the second image data was not forged or modulated. Detailed explanation regarding the image verifying operation will be described later in FIG. 5.

Meanwhile, the processor 120 may generate the first image data including the second authentication information by using a steganography method, and if a predetermined event (a first event) occurs, the processor 120 may change an algorithm by the steganography method.

Here, the steganography method may mean a method of hiding specific information by encrypting it in an image or audio. For example, steganography may mean a technology of displaying data in a very small size in a specific part of image data, or displaying data in a similar color to the color displayed in an image. The processor 120 may insert the second authentication information in a very small size into a specific part of an image that will be transmitted for a video call by using the steganography method. Then, the processor 120 may ultimately acquire the first image data including the second authentication information. Then, the processor 120 may transmit the acquired first image data to the external device 201.

Depending on implementation examples, the processor 120 may generate the first image data including the second authentication information by using a watermark method.

Here, the algorithm may include at least one of an operation of determining into which part of an image the authentication information will be inserted, an operation of determining in which size the authentication information will be inserted, or an operation of determining in which color the authentication information will be displayed.

Accordingly, a change of the algorithm may mean a change of the authentication information insertion method, and a change of the authentication information insertion method may mean changing at least one of the insertion location, the insertion size, or the insertion color. For example, the processor 120 inserts the authentication information in a size 2 and a gray color on the left side of an image. Here, when a predetermined event occurs, the processor 120 may insert the authentication information in a size 1 and a black color on the right side of the image.

Here, the predetermined event (the first event) may be an event that a predetermined cycle arrives or an event of receiving a user input for changing the algorithm of the authentication information insertion method (e.g., the steganography method).

As an example, if it is identified that an event that a predetermined cycle arrives occurred, the processor 120 may change the algorithm of the authentication information insertion method. For example, it is assumed that the predetermined cycle is one minute (it may change depending on implementation examples). The processor 120 may change the algorithm of the authentication information insertion method every one minute.

As another example, if it is identified that an event of receiving a user input for changing the algorithm of the authentication information insertion method occurred, the processor 120 may change the algorithm of the authentication information insertion method. For example, if a control instruction for changing the algorithm of the authentication information insertion method is received from the user of the electronic device 101, the electronic device 101 changes the algorithm of the authentication information insertion method. Here, the control instruction may be selecting a predetermined UI.

According to yet another embodiment, a change of the algorithm of the authentication information insertion method may be sequentially performed according to a set rule based on a predetermined protocol between the electronic device 101 and the external device 201. If the algorithm is changed according to a set rule, possibility of prediction can be improved, and thus the processing time of a verifying operation can be shortened.

Here, the reason for changing the algorithm of the authentication information insertion method when a predetermined event occurs is for inducing such that it would take a long time for a hacker to acquire authentication information in image data and forge or modulate the data. For example, it is assumed that, while the electronic device 101 was transmitting the first image data including the second authentication information to the external device 201, a hacker snatched the first image data and found out the second authentication information. The hacker may insert the second authentication information into the image that he or she forged or modulated, and transmit it to the external device 201. Once the hacker finds the second authentication information, the hacker can easily acquire the second authentication information from the next time. Accordingly, the processor 120 may interfere with a hacker's acquisition of authentication information by changing the authentication information insertion method.

Meanwhile, the processor 120 may generate the first authentication information based on time information and device identification information.

Here, the time information may mean the time of generating authentication information or the current time. Here, the device identification information may mean the unique authentication key (or authentication key value) of the device that generated authentication information.

Here, the processor 120 may calculate a hash value corresponding to the time information and the device identification information by using a predetermined hash function. Depending on implementation examples, the processor 120 may calculate a hash value corresponding to the time information and the device identification information by using an overlapping hash function. Here, the calculated hash value may be the first authentication information. Here, the first authentication information may be described as an integrated tag.

Meanwhile, if a predetermined event (the second event) occurs, the processor 120 may change at least one of the time information or the device identification information and generate third authentication information, and store the generated third authentication information in the memory 130, and transmit the third authentication information instead of the first authentication information to the external device 201 through the communication module 190.

Specifically, if the predetermined event (the second event) occurs, the processor 120 may discard the first authentication information, and generate the third authentication information which is new authentication information. Here, the predetermined event (the second event) may mean an event that the previous authentication information becomes invalid. Then, if it is identified that the predetermined event (the second event) that the previous authentication information becomes invalid occurred in any one device among the electronic device 101 or the external device 201, the identified device may notify this fact to the counterpart device by using a predetermined protocol.

Depending on implementation examples, if the predetermined event (the second event) occurs, the processor 120 may change the algorithm of the hash function. Specifically, the processor 120 may change at least one of the type of the algorithm, the number of repetitions, or the salt value of the hash function. Here, the algorithm of the hash function may be changed randomly.

Meanwhile, the predetermined event (the second event) may be an event that a predetermined cycle arrives or an event of receiving a user input for regenerating the authentication information.

As an example, if it is identified that an event that a predetermined cycle arrives occurred, the electronic device 101 may generate new authentication information. For example, it is assumed that the predetermined cycle is 0.01 second. The electronic device 101 may generate new authentication information every 0.01 second. Meanwhile, depending on implementation examples, the predetermined cycle may be changed to a time calculated by a predetermined method or a random time. Here, the cycle of regeneration of the authentication information of the electronic device 101 and the cycle of regeneration of the authentication information of the external device 201 may be different. The cycle of regeneration of the authentication information of the electronic device 101 may be 0.01 second, and the cycle of regeneration of the authentication information of the external device 201 may be 0.02 second.

As another example, if it is identified that an event of receiving a user input for regenerating the authentication information occurred, the electronic device 101 may generate new authentication information. For example, if a control instruction for generating new authentication information is received from the user 10 of the electronic device 101, the electronic device 101 generates new authentication information. Here, the control instruction may be selecting a predetermined UI. Here, when the user input is received in any one device among the electronic device 101 and the external device 201, both of the electronic device 101 and the external device 201 may regenerate authentication information. Meanwhile, according to a different implementation example, when the user input is received in any one device among the electronic device 101 and the external device 201, only the device that received the user input may regenerate authentication information.

Here, a detailed operation of regenerating authentication information will be described later in FIG. 9.

Meanwhile, the electronic device 101 may further include a camera module 180, and the processor 120 may acquire photographed image information through the camera module 180, and generate the first image data by combining the acquired photographed image information and the second authentication information.

Here, the photographed image information may mean information corresponding to an image photographed in real time while performing a video call. Specifically, the processor 120 may acquire real time photographed image information from the camera module 180. Then, the processor 120 may generate the first image data by inserting the second authentication information into the photographed image.

In the aforementioned explanation, an operation of verifying authentication information included in image data was explained. However, depending on implementation examples, the processor 120 may verify authentication information included in audio data.

Meanwhile, if a user input for performing a video call with the external device 201 is received, the processor 120 may generate first audio data including the second authentication information, and transmit the generated first audio data to the external device 201 through the communication module 190. Then, when second audio data is received from the external device 201 through the communication module 190, the processor 120 may identify authentication information in the second audio data, and if the first authentication information and the authentication information identified in the second audio data coincide, the processor 120 may determine that the second audio data is authenticated data.

Specifically, the processor 120 may generate the first audio data by inserting the second authentication information into audio information to be transmitted to the external device 201. Then, the processor 120 may transmit the generated first audio data to the external device 201. The external device 201 may identify authentication information in the first audio data received from the electronic device 101. Then, if the authentication information identified in the first audio data coincides with the second authentication information, the external device 201 may determine that the first audio data is authenticated data.

Specifically, the external device 201 may generate the second audio data by inserting the first authentication information into audio information to be transmitted to the electronic device 101. Then, the external device 201 may transmit the generated second audio data to the electronic device 101. The electronic device 101 may identify authentication information in the second audio data received from the external device 201. Then, if the authentication information identified in the second audio data coincides with the first authentication information, the electronic device 101 may determine that the second audio data is authenticated data.

Meanwhile, the processor 120 may generate the first audio data including the second authentication information by using a non-audible frequency insertion method, and if a predetermined event (the third event) occurs, the processor 120 may change an algorithm by the non-audible frequency insertion method.

Here, the non-audible frequency insertion method may mean a technology of inserting authentication information into the sound output by a user using a video call by using a frequency range that a person cannot hear such that the conversation is not interfered.

Here, the predetermined event (the third event) may mean an event that a predetermined cycle arrives or an event of receiving a user input for regenerating authentication information. Meanwhile, as the predetermined event (the third event) may correspond to the aforementioned predetermined event (the second event), overlapping explanation will be omitted.

Here, the algorithm by the non-audible frequency insertion method may mean an algorithm of inserting specific information into audio information based on at least one the amplitude, the frequency, or the phase within a non-audible frequency range.

Here, a change of the algorithm by the non-audible frequency insertion method may mean changing at least one of the amplitude, the frequency, or the phase within a non-audible frequency range.

Meanwhile, the electronic device 101 may further include an audio module 170, and the processor 120 may acquire voice audio information through the audio module 170, and generate the first audio data by combining the acquired voice audio information and the second authentication information.

Here, the audio module 170 may mean a module that acquires a sound and converts the sound into an electronic signal. For example, the audio module 170 may mean a microphone. Specifically, the processor 120 may acquire a voice in real time through the audio module 170, and acquire voice audio information corresponding to the acquired voice. Then, the processor 120 may generate the first audio data by inserting the second authentication information into the acquired voice audio information by using the non-audible frequency insertion method. Then, the processor 120 may transmit the generated first audio data to the external device 201.

Meanwhile, detailed explanation regarding an operation of verifying audio data will be described later in FIGS. 7 and 8.

Meanwhile, the electronic device 101 according to the various embodiments of the disclosure may check whether there is forgery or modulation by verifying image data or audio data.

Also, the electronic device 101 according to the various embodiments of the disclosure may perform a change of the algorithm of inserting authentication information or generation of new authentication information based on at least one predetermined event. Accordingly, time may be taken for a hacker to acquire authentication information. As a video call uses a real time streaming method, if it takes a long time for a hacker to acquire authentication information, image manipulation can be doubted easily. Accordingly, a hacker should repeatedly find a changed algorithm or newly generated authentication information, and thus it would become difficult to hack a video call.

Meanwhile, in the data verification method according to the various embodiments of the disclosure, it is not necessary to acquire common authentication keys by using a separate authentication server, and thus there may be no overload of traffic, and as an authentication server distributing common authentication keys is not needed, the maintenance cost may be small.

Meanwhile, the data verification method according to the various embodiments of the disclosure is operated based on a framework, and thus possibility of streaming manipulation in a user application can be reduced.

Meanwhile, authentication information used in an operation of transmitting authentication information (or an operation of exchanging authentication information) and an operation of generating image data including authentication information according to the various embodiments of the disclosure may be stored in a security area. Here, the security area may mean a memory space storing important information that should be protected from external intrusion. For example, the security area may mean a trust zone. The processor 120 may transmit the first authentication information stored in the security area to an external device, and store the second authentication information received from the external device in the security area. Then, the processor 120 may generate the first image data including the second authentication information stored in the security area.

As an example, the security area may be an area included in the memory 130. The memory 130 may include a plurality of areas, and one area among the plurality of areas may be the security area. For example, the memory 130 includes a general area storing general data and a security area storing important data. The processor 120 may allot a specific space to the memory 130 and use it as the security area. Also, through a method of dividing and providing a general area and a security area, a trusted execution environment (TEE) may be implemented. For example, as a security area, there is a trust zone, etc. Components related to this will be illustrated in FIG. 12.

As another example, the security area may be an area included in a separate security memory (not shown) other than the memory 130. Accordingly, the processor 120 may transmit authentication information or generate image data by using authentication information stored in a different security memory (not shown) from the memory 130.

Meanwhile, the operation of transmitting authentication information (or the operation of exchanging authentication information) and the operation of generating image data including authentication information may be performed in a framework but not a separate application of the electronic device 101. That is, operations performed by using authentication information may be performed in a framework level.

Meanwhile, in the above, only simple components constituting the electronic device 101 were illustrated and explained, but various components may additionally be included in actual implementation. Explanation in this regard will be described below with reference to FIG. 3.

FIG. 3 is a diagram for illustrating a network environment according to an embodiment of the disclosure.

FIG. 3 is a block diagram of the electronic device 101 inside the network environment 100 according to the various embodiments.

Referring to FIG. 3, in the network environment 100, the electronic device 101 may communicate with the electronic device 102 through the first network 198 (e.g.: a near distance wireless communication network), or communicate with at least one of the electronic device 104 or the server 108 through the second network 199 (e.g.: a long distance wireless communication network). According to another embodiment, the electronic device 101 may communicate with the electronic device 104 through the server 108. Also, according to yet another embodiment, the electronic device 101 may include a processor 120, a memory 130, an input module 150, an acoustic output module 155, a display module 160, an audio module 170, a sensor module 176, an interface 177, a connection terminal 178, a haptic module 179, a camera module 180, a power management module 188, a battery 189, a communication module 190, a subscriber identification module 196, or an antenna module 197. In some embodiments, in the electronic device 101, at least one (e.g.: the connection terminal 178) of these components may be omitted, or one or more other components may be added. Also, in some embodiments, some (e.g.: the sensor module 176, the camera module 180, or the antenna module 197) of these components may be integrated as one component (e.g.: the display module 160).

The processor 120 may, for example, execute software (e.g.: the program 140) and control at least one other component (e.g.: a hardware or software component) of the electronic device 101 connected to the processor 120, and perform various kinds of data processing or operations. According to a further embodiment, as a part of data processing or an operation, the processor 120 may store instructions or data received from another component (e.g.: the sensor module 176 or the communication module 190) in the volatile memory 132, process instructions or data stored in the volatile memory 132, and store the result data in the non-volatile memory 134. Also, according to still another embodiment, the processor 120 may include a main processor 121 (e.g.: a central processing unit or an application processor) or a subsidiary processor 123 (e.g.: a graphic processing unit, a neural processing unit (NPU), an image signal processor, a sensor hub processor, or a communication processor) that can be operated independently or together with the main processor 121. For example, in case the electronic device 101 includes the main processor 121 and the subsidiary processor 123, the subsidiary processor 123 sets to use lower power than the main processor 121, or to be specified for a designated function. The subsidiary processor 123 may be implemented separately from the main processor 121, or as a part of the main processor 121.

The subsidiary processor 123 may, for example, control at least some of the functions or states related to at least one component (e.g.: the display module 160, the sensor module 176, or the communication module 190) among the components of the electronic device 101 in place of the main processor 121 while the main processor 121 is in an inactive (e.g.: sleep) state, or together with the main processor 121 while the main processor 121 is in an active (e.g.: application execution) state. According to an embodiment, the subsidiary processor 123 (e.g.: the image signal processor or the communication processor) may be implemented as a part of another component (e.g.: the camera module 180 or the communication module 190) that is functionally related. Also, according to another embodiment, the subsidiary processor 123 (e.g.: a neural network processing device) may include a hardware structure specified for processing of an artificial intelligence model. An artificial intelligence model may be generated through machine learning. Such learning may be, for example, performed in the electronic device 101 itself wherein the artificial intelligence model is performed, or performed through a separate server (e.g.: the server 108). Learning algorithms may include, for example, supervised learning, unsupervised learning, semi-supervised learning, or reinforcement learning, but the learning algorithms are not limited to the aforementioned examples. An artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), and deep Q-networks, or a combination of two or more of the above, but is not limited to the aforementioned examples. An artificial intelligence model may include a software structure additionally or alternatively, other than a hardware structure.

The memory 130 may store various kinds of data used by at least one component (e.g.: the processor 120 or the sensor module 176) of the electronic device 101. The data may include, for example, software (e.g.: the program 140), and input data or output data regarding instructions related to it. The memory 130 may include a volatile memory 132 or a non-volatile memory 134. The non-volatile memory 134 may include at least one of an internal memory 136 or an external memory 138.

The program 140 may be stored as software in the memory 130, and may include, for example, an operation system 142, a middleware 144, or an application 146.

The input module 150 may receive instructions or data to be used for the components (e.g.: the processor 120) of the electronic device 101 from the outside (e.g.: the user) of the electronic device 101. The input module 150 may include, for example, a microphone, a mouse, a keyboard, keys (e.g.: buttons), or a digital pen (e.g.: a stylus pen).

The acoustic output module 155 may output an acoustic signal to the outside of the electronic device 101. The acoustic output module 155 may include, for example, a speaker or a receiver. The speaker may be used for general uses such as reproduction of multimedia or reproduction of recording. The receiver may be used for receiving an incoming call. According to yet another embodiment, the receiver may be implemented separately from the speaker, or as a part of the speaker.

The display module 160 may visually provide information to the outside (e.g.: the user) of the electronic device 101. The display module 160 may include, for example, a display, a hologram device, or a projector, and a control circuit for controlling the devices. According to a further embodiment, the display module 160 may include a touch sensor set to detect a touch, or a pressure sensor set to measure the strength of power generated by the touch.

The audio module 170 may convert a sound into an electronic signal, or convert an electronic signal into a sound, on the other way. According to still another embodiment, the audio module 170 may acquire a sound through the input module 150, or output a sound through the acoustic output module 155, or an external electronic device (e.g.: the electronic device 102) (e.g.: a speaker or a headphone) connected with the electronic device 101 directly or wirelessly.

The sensor module 176 may detect an operation state (e.g.: the power or the temperature), or an external environmental state (e.g.: the user state) of the electronic device 101, and generate an electronic signal or a data value corresponding to the detected state. According to an embodiment, the sensor module 176 may include, for example, a gesture sensor, a gyro sensor, a barometric sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 177 may support one or more designated protocols that can be used for the electronic device 101 to be connected with an external electronic device (e.g.: the electronic device 102) directly or wirelessly. According to another embodiment, the interface 177 may include, for example, a high definition multimedia interface (HDMI), a universal serial bus (USB) interface, an SD card interface, or an audio interface.

The connection terminal 178 may include a connector through which the electronic device 101 can be physically connected to an external electronic device (e.g.: the electronic device 102). According to yet another embodiment, the connection terminal 178 may include, for example, an HDMI connector, a USB connector, an SD card connector, or an audio connector (e.g.: a headphone connector).

The haptic module 179 may convert an electronic signal into a mechanical stimulus (e.g.: vibration or a movement) or an electronic stimulus that can be recognized by a user through a tactile or kinesthetic sense. According to a further embodiment, the haptic module 179 may include, for example, a motor, a piezoelectric element, or an electronic stimulus device.

The camera module 180 may photograph a still image and a moving image. According to still another embodiment, the camera module 180 may include one or more lenses, image sensors, image signal processors, or flashes.

The power management module 188 may manage power supplied to the electronic device 101. According to an embodiment, the power management module 188 may be implemented as, for example, at least a part of a power management integrated circuit (PMIC).

The battery 189 may provide power to at least one component of the electronic device 101. According to another embodiment, the battery 189 may include, for example, a primary cell that cannot be recharged, a secondary cell that can be recharged, or a fuel cell.

The communication module 190 may support establishment of a direct (e.g.: wired) communication channel or a wireless communication channel between the electronic device 101 and an external electronic device (e.g.: the electronic device 102, the electronic device 104, or the server 108), and performing of communication through the established communication channel. The communication module 190 may include one or more communication processors that are operated independently from the processor 120 (e.g.: an application processor), and support direct (e.g.: wired) communication or wireless communication. According to yet another embodiment, the communication module 190 may include a wireless communication module 192 (e.g.: a cellular communication module, a near distance wireless communication module, or a global navigation satellite system (GNSS) communication module) or a wired communication module 194 (e.g.: a local area network (LAN) communication module, or a power line communication module). A corresponding communication module among these communication modules may communicate with an external device 104 through the first network 198 (e.g.: a near distance communication network such as Bluetooth, wireless fidelity (Wi-Fi) direct or infrared data association (IrDA)) or the second network 199 (e.g.: a long distance communication network such as a legacy cellular network, a fifth generation (5G) network, a next generation communication network, the Internet, or a computer network (e.g.: a LAN or a wide area network (WAN)). Such communication modules of various types may be integrated as one component (e.g.: a single chip), or implemented as a plurality of components (e.g.: a plurality of chips) separate from one another. The wireless communication module 192 may check or authenticate the electronic device 101 in a communication network such as the first network 198 or the second network 199 by using the subscriber information (e.g.: the International Mobile Subscriber Identity (IMSI)) stored in the subscriber identification module 196.

The wireless communication module 192 may support the 5G network after the fourth generation (4G) network and a next generation communication technology, e.g., a new radio (NR) access technology. The NR access technology may support high speed transmission (enhanced mobile broadband (eMBB)) of high capacity data, minimization of terminal power and access of a plurality of terminals (massive machine type communications (mMTC)), or high reliability and low latency (ultra-reliable and low-latency communications (URLLC)). The wireless communication module 192 may, for example, support a high frequency band (e.g.: a millimeter wave (mmWave) band) for achieving a high data transmission rate. The wireless communication module 192 may support various technologies for securing of performance in a high frequency band, e.g., technologies such as beamforming, massive multiple-input and multiple-output (MIMO)), full dimensional MIMO (FD-MIMO), an array antenna, analog beamforming, or a large scale antenna. The wireless communication module 192 may support various requests prescribed in the electronic device 101, an external electronic device (e.g.: the electronic device 104) or a network system (e.g.: the second network 199). According to a further embodiment, the wireless communication module 192 may support a peak data rate (e.g.: greater than or equal to 20 Gbps) for realization of eMBB, a loss coverage (e.g.: lower than or equal to 164 dB) for realization of mMTC, or a U-plane latency (e.g.: lower than or equal to 0.5 ms for each of a downlink (DL) and an uplink (UL), or lower than or equal to 1ms for a round trip) for realization of URLLC.

The antenna module 197 may transmit a signal or power to the outside (e.g.: an external electronic device), or receive them from the outside. According to still another embodiment, the antenna module 197 may include an antenna including a conductor formed on a substrate (e.g.: a printed circuit board (PCB)) or a radiator consisting of a conductive pattern. According to an embodiment, the antenna module 197 may include a plurality of antennas (e.g.: array antennas). In this case, at least one antenna appropriate for a communication method used in a communication network such as the first network 198 or the second network 199 may be selected from the plurality of antennas by, for example, the communication module 190. A signal or power may be transmitted or received between the communication module 190 and an external electronic device through the selected at least one antenna. According to some embodiments, another component (e.g.: a radio frequency integrated circuit (RFIC)) other than the radiator may additionally be formed as a part of the antenna module 197.

According to the various embodiments, the antenna module 197 may form an mm Wave antenna module. According to another embodiment, the mm Wave antenna module may include a printed circuit board, an RFIC that is arranged on the first surface (e.g.: the lower surface) of the printed circuit board or an adjacent location thereto and can support a designated high frequency band (e.g.: an mmWave band), and a plurality of antennas (e.g.: array antennas) that are arranged on the second surface (e.g.: the upper surface or the side surface) of the printed circuit board or an adjacent location thereto and can transmit or receive a signal of the designated high frequency band.

At least some of the components may be connected with one another through a communication method among ambient devices (e.g.: a bus, a general purpose input and output (GPIO), a serial peripheral interface (SPI), or a mobile industry processor interface (MIPI)), and exchange signals (e.g.: instructions or data) with one another.

According to yet another embodiment, instructions or data may be transmitted or received between the electronic device 101 and the external device 104 through the server 108 connected to the second network 199. Each of the external devices 102 or 104 may be a device that is of the same type as or a different type from the electronic device 101. According to a further embodiment, all or some of the operations executed in the electronic device 101 may be executed in one or more external electronic devices among the external devices 102 or 104 or the server 108. For example, in case the electronic device 101 needs to perform a specific function or service automatically, or in response to a request from the user or another device, the electronic device 101 may request the one or more external electronic devices to perform at least a part of the function or the service instead of executing the function or the service by itself, or in addition to it. The one or more external electronic devices that received the request may execute at least a part of the requested function or service, or an additional function or service related to the request, and transmit the result of the execution to the electronic device 101. The electronic device 101 may process the result as it is or additionally, and provide it as at least a part of a response to the request. For this, for example, a cloud computing, a distributed computing, a mobile edge computing (MEC), or a client-server computing technology may be used. The electronic device 101 may, for example, provide an ultra low-latency service by using distributed computing or mobile edge computing. In another embodiment, the external device 104 may include an Internet of Things (IoT) device. The server 108 may be an intelligent server using machine learning and/or a neural network. According to still another embodiment, the external device 104 or the server 108 may be included inside the second network 199. The electronic device 101 may be applied to an intelligent service (e.g.: smart home, smart city, smart car, or healthcare) based on 5G communication technologies and IoT related technologies.

Figure 4:
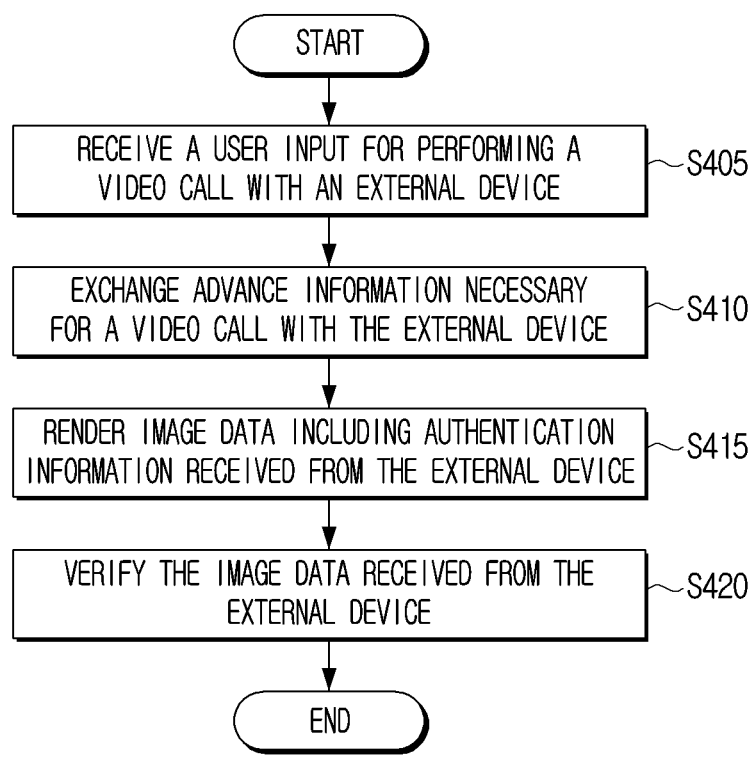
FIG. 4 is a diagram for illustrating a data verifying operation of an electronic device according to an embodiment of the disclosure.

FIG. 4 is a diagram for illustrating a data verifying operation of an electronic device according to an embodiment of the disclosure.

Referring to FIG. 4, the electronic device 101 may receive a user input for performing a video call with an external device 201 in operation S405. Here, the user input may mean a user instruction requesting to perform a video call with a specific counterpart.

Also, the electronic device 101 may exchange advance information necessary for a video call with the external device 201. Here, the advance information may mean information necessary for performing a video call. It may mean information necessary for communicative connection and authentication information for verifying data provided in a video call.

The electronic device 101 and the external device 201 may exchange information necessary for communicative connection with each other in operation S410. Here, the information necessary for communicative connection may mean information on the model of the device or information on the unique number of the device performing the video call. For example, the unique device number of the electronic device 101 may be #1, and the unique device number of the external device 201 may be #2. Here, if a user input for performing communication with the external device 201 is received from the user 10 of the electronic device 101, the electronic device 101 may acquire the unique device number #2 corresponding to the external device 201, and perform communicative connection with the external device 201 by using the acquired unique device number #2 of the external device 201. Likewise, the external device 201 may perform communicative connection with the electronic device 101 by using the unique device number #1 corresponding to the electronic device 101.

Here, the electronic device 101 and the external device 201 may exchange authentication number with each other. The electronic device 101 may generate the first authentication information, and the external device 201 may generate the second authentication information. Then, the electronic device 101 may transmit the first authentication information to the external device 201, and the external device 201 may transmit the second authentication information to the electronic device 101.

Also, the electronic device 101 may perform an image data rendering operation including the authentication information (the second authentication information) received from the external device 201 in operation S415. Specifically, the electronic device 101 may render (or generate) the first image data by combining the authentication information received from the external device 201 and the image information (e.g., the original image to which the authentication information is not combined) to be provided to the external device 201 in the video call service. Here, the electronic device 101 may transmit the rendered first image data to the external device 201.

Here, the rending operation may be performed with respect to an encoding buffer encoding live streaming data and a frame buffer that is right before displaying the streaming data. The encoding buffer and the frame buffer may be allotted to a safe storage (e.g., the trust zone) of the electronic device 101, and they may be buffers that are impossible to be accessed in the application authority. Here, the safe storage may correspond to the safe areas 1212-2, 1222-2 in FIG. 12.

Here, in performing a rendering operation, the electronic device 101 may change the second authentication information received from the external device 201 into a binary form, and generate the first image data including the changed second authentication information in a binary form. Here, the first image data may mean data wherein an I frame is encoded.

Here, in performing an operation of generating audio data including the authentication information, the electronic device 101 may dispersively store the binary of the authentication information by using a non-audible area of the pulse code modulation (PCM) data before encoding. Then, the electronic device 101 may generate the first audio data to be transmitted to the external device 201 by combining the binary of the authentication information that was dispersively stored and the audio information (e.g., the original audio to which the authentication information is not combined). Here, the generated first audio data may mean encoded data.

Also, the electronic device 101 may verify the image data (the second image data) received from the external device 201 in operation S420. Specifically, the electronic device 101 may receive the second image data from the external device 201. Then, the electronic device 101 may identify whether authentication information is included in the received second image data. Here, the electronic device 101 may identify authentication information included in the second image data. Then, the electronic device 101 may identify whether the authentication information identified from the second image data is identical to the first authentication information.

Here, if the authentication information identified from the second image data coincides with the first authentication information, the electronic device 101 may determine that verification of the second image data succeeded. Here, if the authentication information identified from the second image data does not coincide with the first authentication information or authentication information is not identified from the second image data, the electronic device 101 may identify that verification of the second image data failed.

Here, in the operation of verifying the image data, the electronic device 101 may decode the I frame of the received second image data. Then, the electronic device 101 may identify (or acquire or extract) the binary of the authentication information in the decoded I frame based on the authentication information insertion algorithm. Then, the electronic device 101 may perform data verification by comparing the identified binary with the first authentication information.

Here, in the operation of verifying the audio data, the electronic device 101 may decode the received second audio data. Then, the electronic device 101 may acquire the binary of the authentication information that was dispersively stored by using the non-audible area of the pulse code modulation (PCM) data of the decoded second audio data. Then, the electronic device 101 may perform data verification by comparing the acquired binary with the first authentication information.

Figure 5:
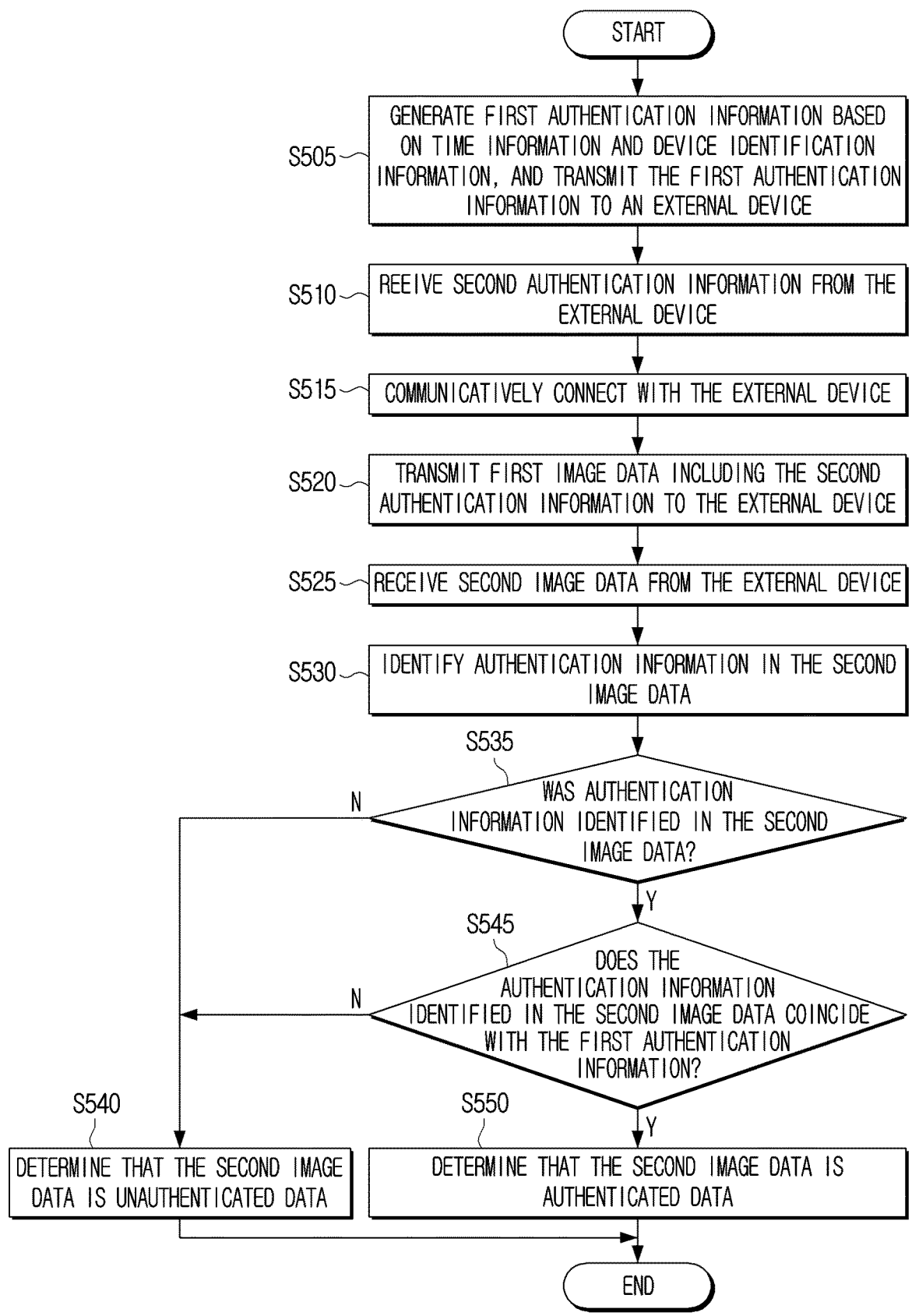
FIG. 5 is a flow chart for illustrating the detailed operation in FIG. 4 according to an embodiment of the disclosure.

FIG. 5 is a flow chart for illustrating the detailed operation in FIG. 4 according to an embodiment of the disclosure.

Referring to FIG. 5, the electronic device 101 may receive a user input for performing a video call with the external device 201. Then, the electronic device 101 may generate first authentication information based on time information and device identification information, and transmit the generated first authentication information to the external device 201 in operation S505. Here, the first authentication information may be used in verifying the image data received from the external device 201.

Also, the electronic device 101 may receive the second authentication information from the external device 201 in operation S510. Here, the second authentication information may be information generated in the external device 201 itself.

In addition, when the second authentication information is received from the external device 201, the electronic device 101 may perform communicative connection with the external device 201 in operation S515.

Further, when communicative connection of the electronic device 101 with the external device 201 is performed, the electronic device 101 may transmit the first image data including the second authentication information to the external device 201 in operation S520. Specifically, the electronic device 101 may generate the first image data by combining the second authentication information received from the external device 201 and the image information to be provided to the external device 201 in the video call service. Then, the electronic device 101 may transmit the generated first image data to the external device.

Also, the electronic device 101 may receive the second image data from the external device 201 in operation S525. Then, the electronic device 101 may identify authentication information in the second image data in operation S530.

In addition, the electronic device 101 may identify whether authentication information is identified in the second image data in operation S535. If authentication information is not identified in the second image data in operation S535-N, the electronic device 101 may determine that the second image data is unauthenticated data in operation S540. That is, the electronic device 101 may determine that verification of the second image data failed.

Here, if authentication information is identified in the second image data in operation S535-Y, the electronic device 101 may identify whether the authentication information identified in the second image data coincides with the first authentication information in operation S545.

Here, if the authentication information identified in the second image data does not coincide with the first authentication information in operation S545-N, the electronic device 101 may determine that the second image data is unauthenticated data in operation S540. That is, the electronic device 101 may identify that verification of the second image data failed.

Here, if the authentication information identified in the second image data coincides with the first authentication information in operation S545-Y, the electronic device 101 may determine that the second image data is authenticated data in operation S550. That is, the electronic device 101 may determine that verification of the second image data succeeded.

Figure 6:
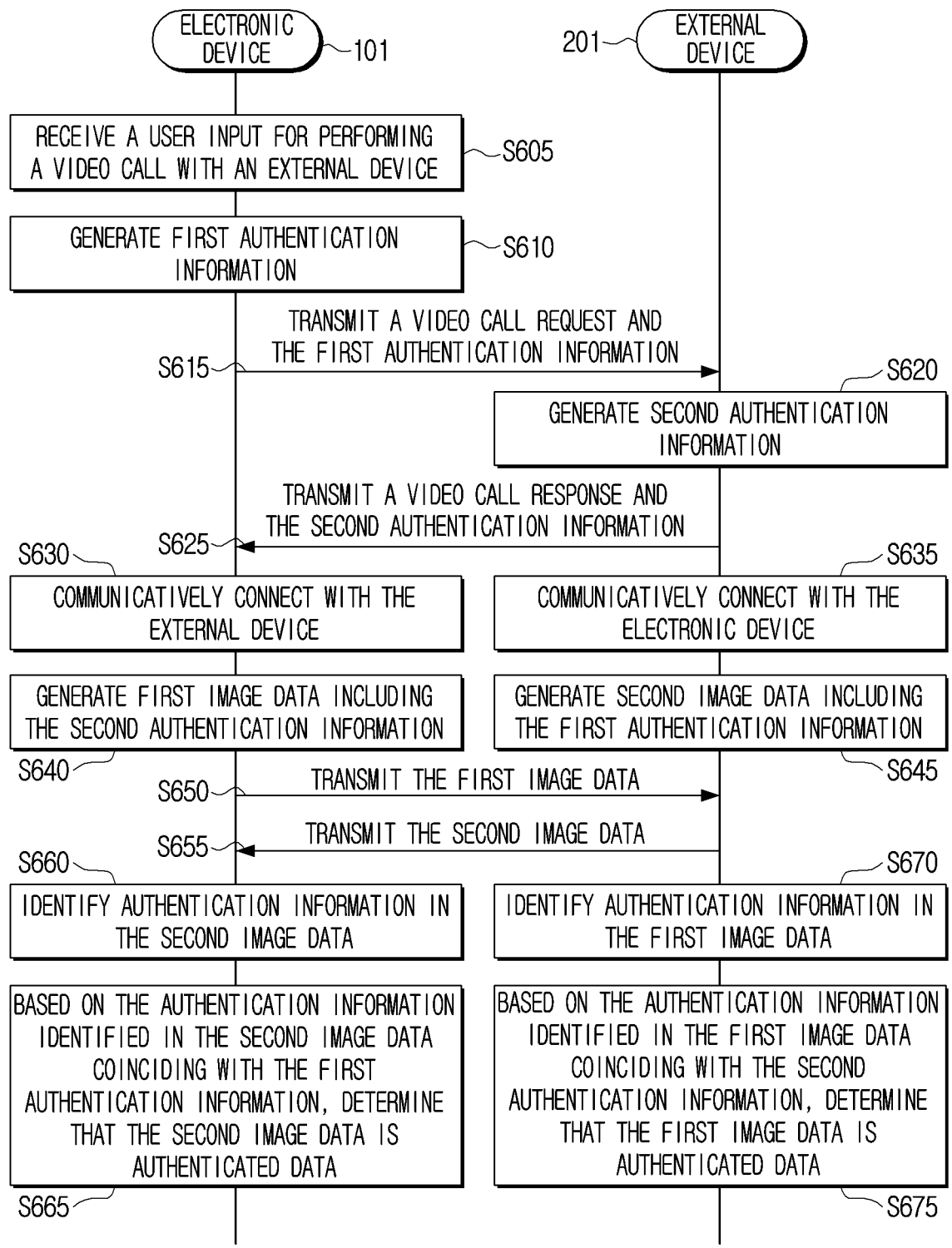
FIG. 6 is a flow chart for illustrating a video call performing operation between an electronic device and an external device according to an embodiment of the disclosure.

FIG. 6 is a flow chart for illustrating a video call performing operation between an electronic device and an external device according to an embodiment of the disclosure.

Referring to FIG. 6, the electronic device 101 may receive a user input for performing a video call with an external device in operation S605. Then, the electronic device 101 may generate first authentication information based on time information of the electronic device 101 and device identification information of the electronic device 101 in operation S610. Then, the electronic device 101 may transmit a video call request and the first authentication information to the external device 201 in operation S615.

Here, when the external device 201 receives the video call request from the electronic device 101, the external device 201 may generate second authentication information based on time information of the external device 201 and device identification information of the external device 201 in operation S620. Then, the external device 201 may transmit a video call response and the generated second authentication information to the electronic device 101 in operation S625.

Here, when the electronic device 101 receives the video call response from the external device 201, the electronic device 101 may perform communicative connection with the external device 201 in operation S630. Then, when the external device 201 transmits the second authentication information to the electronic device 101, the external device 201 may perform communicative connection with the electronic device 101 in operation S635.

Here, the electronic device 101 may generate first image data including the second authentication information in operation S640. Then, the external device 201 may generate second image data including the first authentication information in operation S645.

Here, the electronic device 101 may transmit the generated first image data to the external device 201 in operation S650. Then, the external device 201 may transmit the generated second image data to the electronic device 101 in operation S655.

Here, the electronic device 101 may identify authentication information in the second image data received from the external device 201 in operation S660. Then, if authentication information is not identified in the second image data, the electronic device 101 may determine that the second image data is unauthenticated data. Meanwhile, if authentication information is identified in the second image data, the electronic device 101 may identify whether the authentication information identified from the second image data coincides with the first authentication information.

Here, if the authentication information identified from the second image data does not coincide with the first authentication information, the electronic device 101 may determine that the second image data is unauthenticated data.

Here, if the authentication information identified from the second image data coincides with the first authentication information, the electronic device 101 may determine that the second image data is authenticated data in operation S665.

Here, the external device 201 may identify authentication information in the first image data received from the electronic device 101 in operation S670. Then, if authentication information is not identified in the first image data, the external device 201 may determine that the first image data is unauthenticated data. Meanwhile, if authentication information is identified in the first image data, the external device 201 may identify whether the authentication information identified from the first image data coincides with the second authentication information.

Here, if the authentication information identified from the first image data does not coincide with the second authentication information, the external device 201 may determine that the first image data is unauthenticated data.

Here, if the authentication information identified from the first image data coincides with the second authentication information, the external device 201 may determine that the first image data is authenticated data in operation S675.

Figure 7:
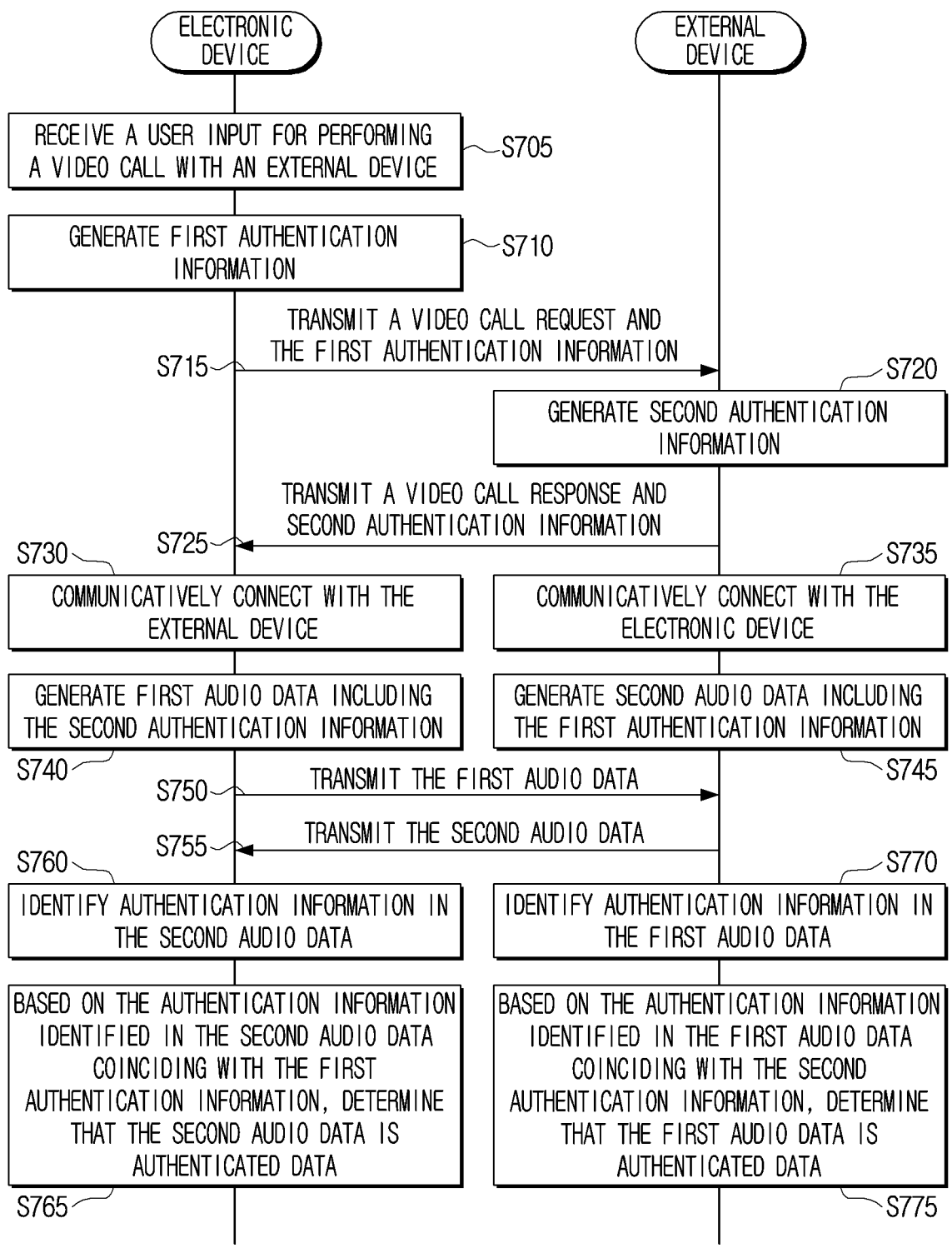
FIG. 7 is a flow chart for illustrating a video call performing operation between an electronic device and an external device according to an embodiment of the disclosure.

FIG. 7 is a flow chart for illustrating a video call performing operation between an electronic device and an external device according to an embodiment of the disclosure.

Referring to FIG. 7, the operations S705, S710, S715, S720, S725, S730, and S735 may correspond to the operations S605, S610, S615, S620, S625, S630, and S635 in FIG. 6, and thus overlapping explanation will be omitted.

Here, the electronic device 101 may generate first audio data including the second authentication information in operation S740. Then, the external device 201 may generate second audio data including the first authentication information in operation S745.

Here, the electronic device 101 may transmit the generated first audio data to the external device 201 in operation S750. Then, the external device 201 may transmit the generated second audio data to the electronic device 101 in operation S755.

Here, the electronic device 101 may identify authentication information in the second audio data received from the external device 201 in operation S760. Then, if authentication information is not identified in the second audio data, the electronic device 101 may determine that the second audio data is unauthenticated data. Meanwhile, if authentication information is identified in the second audio data, the electronic device 101 may identify whether the authentication information identified from the second audio data coincides with the first authentication information.

Here, if the authentication information identified from the second audio data does not coincide with the first authentication information, the electronic device 101 may determine that the second audio data is unauthenticated data.

Here, if the authentication information identified from the second audio data coincides with the first authentication information, the electronic device 101 may determine that the second audio data is authenticated data in operation S765.

Here, the external device 201 may identify authentication information in the first audio data received from the electronic device 101 in operation S770. Then, if authentication information is not identified in the first audio data, the external device 201 may determine that the first audio data is unauthenticated data. Meanwhile, if authentication information is identified in the first audio data, the electronic device 101 may identify whether the authentication information identified from the first audio data coincides with the second authentication information.

Here, if the authentication information identified from the first audio data does not coincide with the second authentication information, the external device 201 may determine that the first audio data is unauthenticated data.

Here, if the authentication information identified from the first audio data coincides with the second authentication information, the external device 201 may determine that the first audio data is authenticated data in operation S775.

Figure 8:
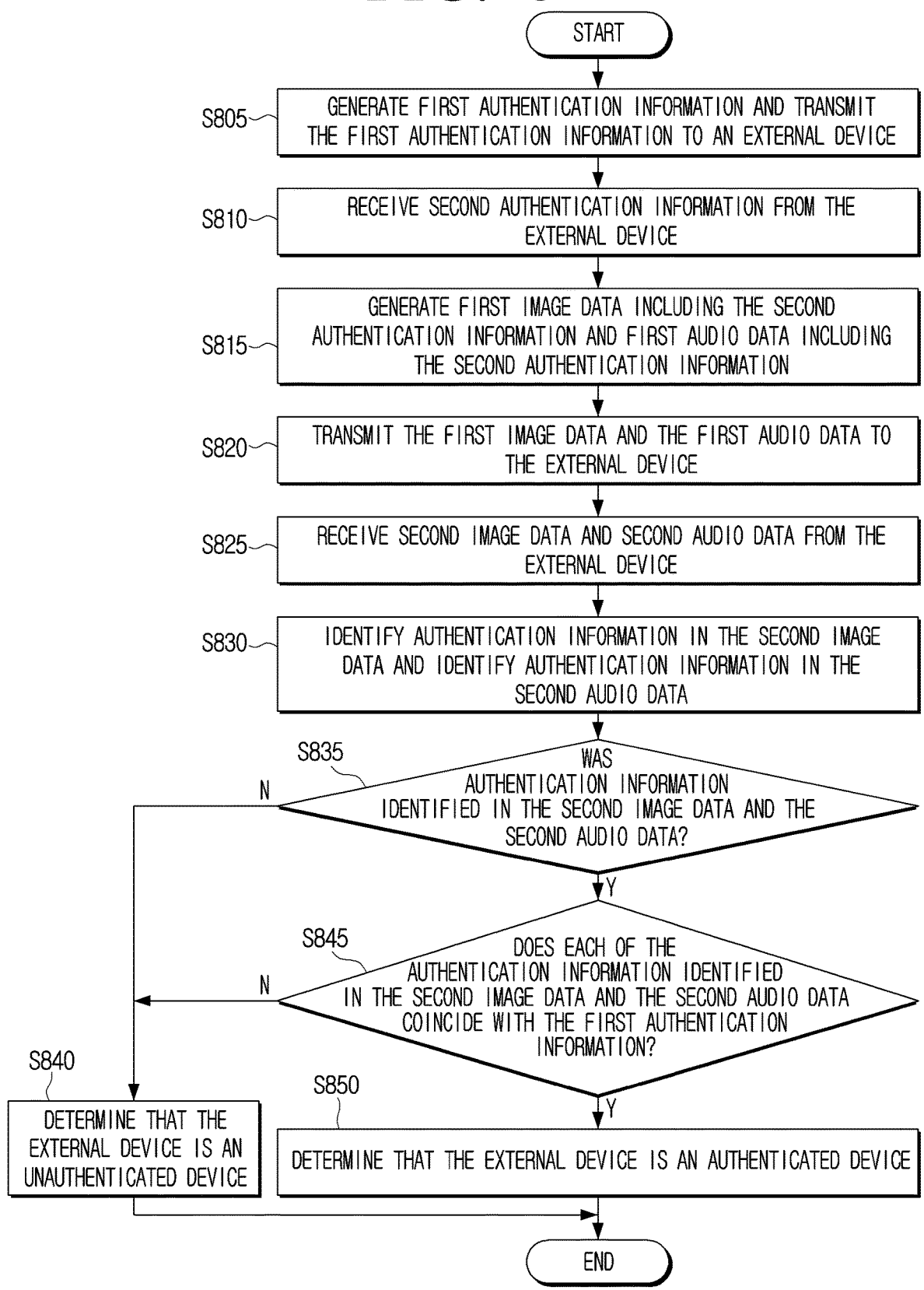
FIG. 8 is a flow chart for illustrating a data verifying operation of an electronic device according to an embodiment of the disclosure.

FIG. 8 is a flow chart for illustrating a data verifying operation of an electronic device according to an embodiment of the disclosure.

Referring to FIG. 8, the electronic device 101 may generate first authentication information and transmit the generated first authentication information to the external device 201 in operation S805. Then, the electronic device 101 may receive second authentication information from the external device 201 in operation S810.

Here, the electronic device 101 may generate first image data including the second authentication information and first audio data including the second authentication information in operation S815. As not only image data but also audio data is provided together for performing a video call, the electronic device 101 and the external device 201 may combine authentication information not only to the image information but also to the audio information. That is, the electronic device 101 and the external device 201 performing a video call may perform a data verifying operation for both of the image data and the audio data.

Here, the electronic device 101 may transmit the generated first image data and the generated first audio data to the external device 201 in operation S820. Then, the electronic device 101 may receive second image data and second audio data from the external device 201 in operation S825. Then, the electronic device 101 may identify authentication information in the second image data received from the external device 201, and identify authentication information in the second audio data received from the external device 201 in operation S830.

Here, the electronic device 101 may identify whether authentication information is identified in both of the second image data and the second audio data in operation S835.

If authentication information is not identified in each of the second image data and the second audio data in operation S835-N, the electronic device 101 may determine that the external device 201 is an unauthenticated device in operation S840. That is, if authentication information is not identified in any one data among the second image data and the second audio data, the electronic device 101 may determine that the external device 201 is an unauthenticated device.

Meanwhile, if authentication information is identified in both of the second image data and the second audio data in operation S835-Y, the electronic device 101 may identify whether each of the authentication information identified in the second image data and the second audio data coincides with the first authentication information in operation S845.

Here, if each of the authentication information identified in the second image data and the second audio data does not coincide with the first authentication information in operation S845-N, the electronic device 101 may determine that the external device 201 is an unauthenticated device in operation S840. That is, if any one authentication information among the authentication information identified in the second image data and the authentication information identified in the second audio data does not coincide with the first authentication information, the electronic device 101 may determine that the external device 201 is an unauthenticated device.

Here, if each of the authentication information identified in the second image data and the second audio data coincides with the first authentication information in operation S845-Y, the electronic device 101 may determine that the external device 201 is an authenticated device in operation S850.

Meanwhile, the embodiment in FIG. 8 illustrated a case wherein authentication information is combined with both of image data and audio data. However, according to a different embodiment, authentication information may be combined with only any one data among image data or audio data.

Figure 9:
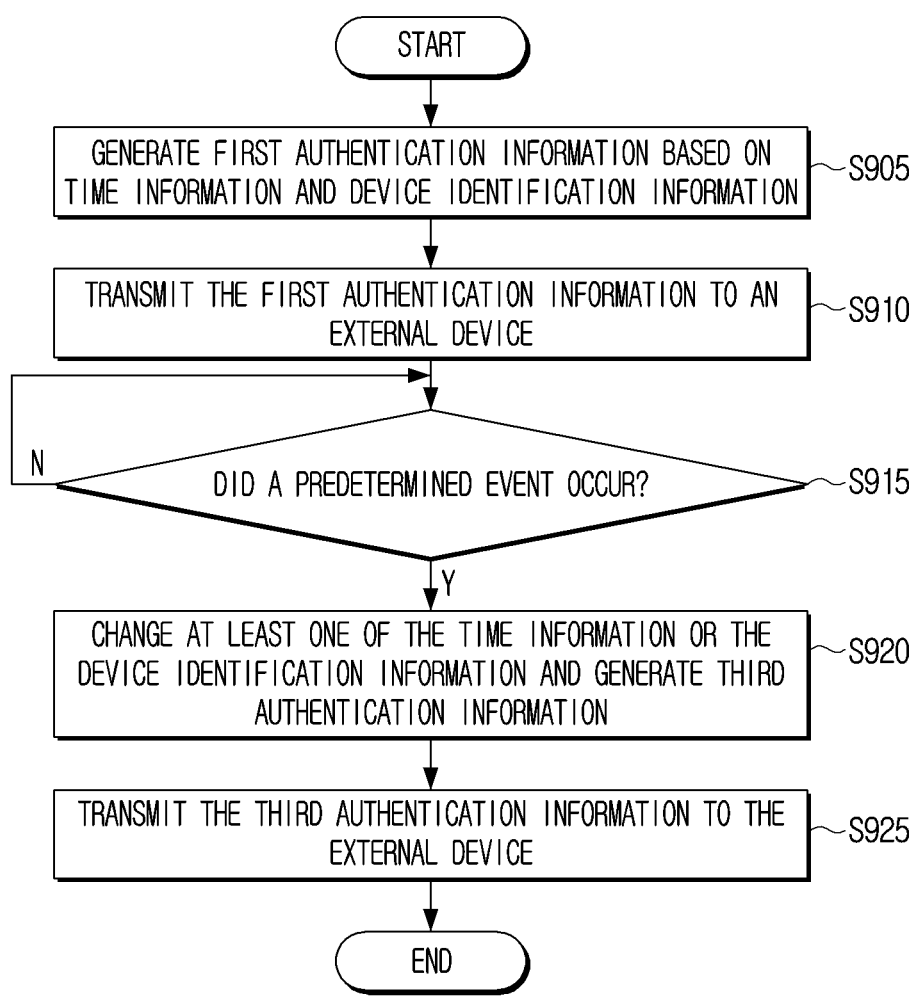
FIG. 9 is a flow chart for illustrating an authentication information changing operation of an electronic device according to an embodiment of the disclosure.

FIG. 9 is a flow chart for illustrating an authentication information changing operation of an electronic device according to an embodiment of the disclosure.

Referring to FIG. 9, the electronic device 101 may generate first authentication information based on time information and device identification information in operation S905. Then, the electronic device 101 may transmit the first authentication information to the external device 201 in operation S910.

Here, the electronic device 101 may identify whether a predetermined event occurs in operation S915. Here, the predetermined event may mean at least one event among an event that a predetermined cycle arrives or an event of receiving a user input for regenerating authentication information.

As an example, if it is identified that an event that a predetermined cycle arrives occurred, the electronic device 101 may delete (or discard) the previous authentication information and generate new authentication information. For example, it is assumed that the predetermined cycle is 0.01 second. The electronic device 101 may generate new authentication information every 0.01 second, and delete (or discard) the previous authentication information. Meanwhile, depending on implementation examples, the predetermined cycle may be changed to a time calculated by a predetermined method or a random time. Here, the cycle of regeneration of the authentication information of the electronic device 101 and the cycle of regeneration of the authentication information of the external device 201 may be different. The cycle of regeneration of the authentication information of the electronic device 101 may be 0.01 second, and the cycle of regeneration of the authentication information of the external device 201 may be 0.02 second.

As another example, if it is identified that an event of receiving a user input for regenerating the authentication information occurred, the electronic device 101 may generate new authentication information. For example, if a control instruction for generating new authentication information is received from the user 10 of the electronic device 101, the electronic device 101 may generate new authentication information. Here, the control instruction may be selecting a predetermined UI. Here, when the user input is received in any one device among the electronic device 101 and the external device 201, both of the electronic device 101 and the external device 201 may regenerate authentication information. Meanwhile, according to a different implementation example, when the user input is received in any one device among the electronic device 101 and the external device 201, only the device that received the user input may regenerate authentication information.

If it is identified that a predetermined event did not occur in operation S915-N, the electronic device 101 may repeatedly identify whether a predetermined event occurs.

Here, if it is identified that a predetermined event occurred in operation S915-Y, the electronic device 101 may change at least one of the time information or the device identification information, and generate third authentication information in operation S920. That is, if it is identified that a predetermined event occurred, the electronic device 101 may change the first authentication information transmitted previously to new authentication information. Each of the electronic device 101 and the external device 201 may generate new authentication information, and exchange the information with each other.

As an example, the third authentication information and the first authentication information may have different time information. As the time point when the first authentication information was generated and the time point when the third authentication information is generated are different, the electronic device 101 may generate new third authentication information by using the time information.

As another example, the first authentication information and the third authentication information may have different device identification information. The electronic device 101 may generate new device identification information for reinforcing security, and generate the third authentication information based on the generated new device identification information.

As still another example, the first authentication information and the third authentication information of the electronic device 101 may have different hash functions. The electronic device 101 may change a calculating operation of applying a hash function by changing the hash function or the hash algorithm. Accordingly, even if the device identification information is identical, the first authentication information and the third authentication information ultimately generated by changing the hash functions may be different.

The electronic device 101 may transmit the generated third authentication information to the external device 201 in operation S925. When the external device 201 receives the third authentication information from the electronic device 101, the external device 201 may generate second image data including the third authentication information instead of the first authentication information.

Meanwhile, in the embodiment in FIG. 9, an operation of transmitting the first authentication information generated once only one time was described. However, depending on implementation examples, the electronic device 101 may repeatedly transmit the first authentication information to the external device 201 according to a predetermined cycle.

As an example, the predetermined cycle of transmitting the authentication information to the external device 201 may be identical to the cycle of regenerating the authentication information. For example, it is assumed that the authentication information is exchanged once per 0.01 second after performing a video call. The electronic device 101 and the external device 201 may exchange the authentication information that they respectively regenerated with each other per 0.01 second.

As another example, the predetermined cycle of transmitting the authentication information to the external device 201 may be different from the cycle of regenerating the authentication information. For example, the cycle of the electronic device 101 and the external device 201 of exchanging the authentication information may be 0.01 second, and the cycle of regenerating the authentication information is changed to a random time. Accordingly, although the electronic device 101 and the external device 201 exchange the authentication information once per 0.01 second, an event of exchanging the authentication information may not necessarily be regenerated.

FIG. 10 is a diagram for illustrating the detailed operation in FIG. 9 according to an embodiment of the disclosure.

Referring to FIG. 10, according to an embodiment 1000-1, the electronic device 101 and the external device 201 may exchange authentication information with each other, and generate image data including the exchanged authentication information.

The electronic device 101 may generate first authentication information 1011 ('123456'), and transmit the generated first authentication information 1011 to the external device 201. Then, the external device 201 may generate second authentication information 1021 ('1a1b1c'), and transmit the generated second authentication information 1021 to the electronic device 101.

Here, the electronic device 101 may generate first image data 1012 including the second authentication information 1021 received from the external device 201, and transmit the generated first image data 1012 to the external device 201. The external device 201 may display the received first image data 1012 on the display module of the external device 201. Accordingly, in the first image data 1012, the second authentication information 1021 is included, and thus the second authentication information 1021 may be displayed on the display module of the external device 201.

Here, the external device 201 may generate second image data 1022 including the first authentication information 1011 received from the electronic device 101, and transmit the generated second image data 1022 to the electronic device 101. The electronic device 101 may display the received second image data 1022 on the display module 160 of the electronic device 101. Accordingly, in the second image data 1022, the first authentication information 1011 is included, and thus the first authentication information 1011 may be displayed on the display module 160 of the electronic device 101.

Meanwhile, according to a different embodiment 1000-2, the electronic device 101 and the external device 201 may generate new authentication information based on a predetermined event.

The electronic device 101 may generate third authentication information 1031 ('456789'), and transmit the generated third authentication information 1031 to the external device 201. Then, the external device 201 may generate fourth authentication information 1041 ('2a2b2c'), and transmit the generated fourth authentication information 1041 to the electronic device 101.

Here, the electronic device 101 may generate third image data 1032 including the fourth authentication information 1041 received from the external device 201, and transmit the generated third image data 1032 to the external device 201. The external device 201 may display the received third image data 1032 on the display module of the external device 201. In the third image data 1032, the fourth authentication information 1041 is included, and thus the fourth authentication information 1041 may be displayed on the display module of the external device 201.

Here, the external device 201 may generate fourth image data 1042 including the third authentication information 1031 received from the electronic device 101, and transmit the generated fourth image data 1042 to the electronic device 101. The electronic device 101 may display the received fourth image data 1042 on the display module 160 of the electronic device 101. In the fourth image data 1042, the third authentication information 1031 is included, and thus the third authentication information 1031 may be displayed on the display module 160 of the electronic device 101.

Meanwhile, in FIG. 10, it was described that the first authentication information 1011, the second authentication information 1021, the third authentication information 1031, and the fourth authentication information 1041 are clearly displayed on the display module, for the convenience of explanation. However, actual authentication information included in image data rendered by using steganography may not be easily recognized.

Figure 11:
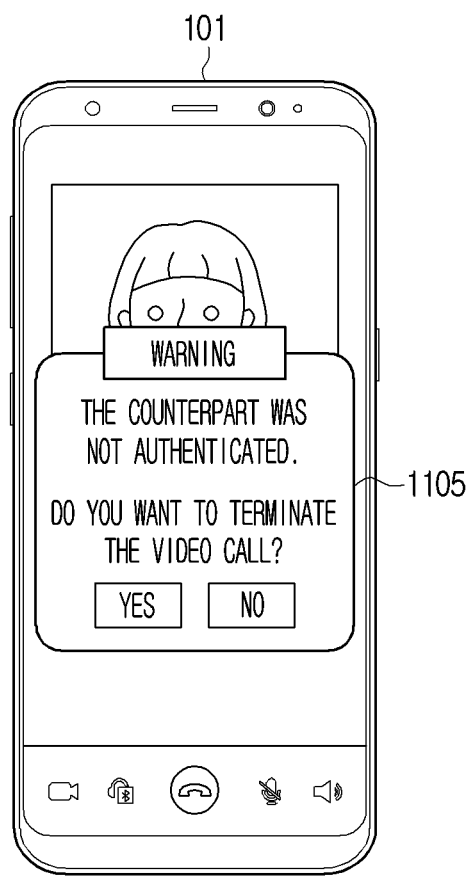
FIG. 11 is a diagram for illustrating a screen that is displayed in case data verification failed according to an embodiment of the disclosure.

FIG. 11 is a diagram for illustrating a screen that is displayed in case data verification failed according to an embodiment of the disclosure.

Referring to FIG. 11, the electronic device 101 may identify authentication information in the second image data received from the external device 201, and identify whether the authentication information identified from the second image data coincides with the first authentication information. If the authentication information identified from the second image data does not coincide with the first authentication information, the electronic device 101 may determine that the second image data is unauthenticated data.

Here, if it is determined that the second image data is unauthenticated data, the electronic device 101 may provide a warning notification.

As an example, the electronic device 101 may display a warning notification on the display module 160 of the electronic device 101. Specifically, the electronic device 101 may display a UI 1105 including the content that the second image data received from the external device 201 was not authenticated on the display module 160 of the electronic device 101.

As another example, the electronic device 101 may output a warning notification through the acoustic output module 155 of the electronic device 101.

Figure 12:
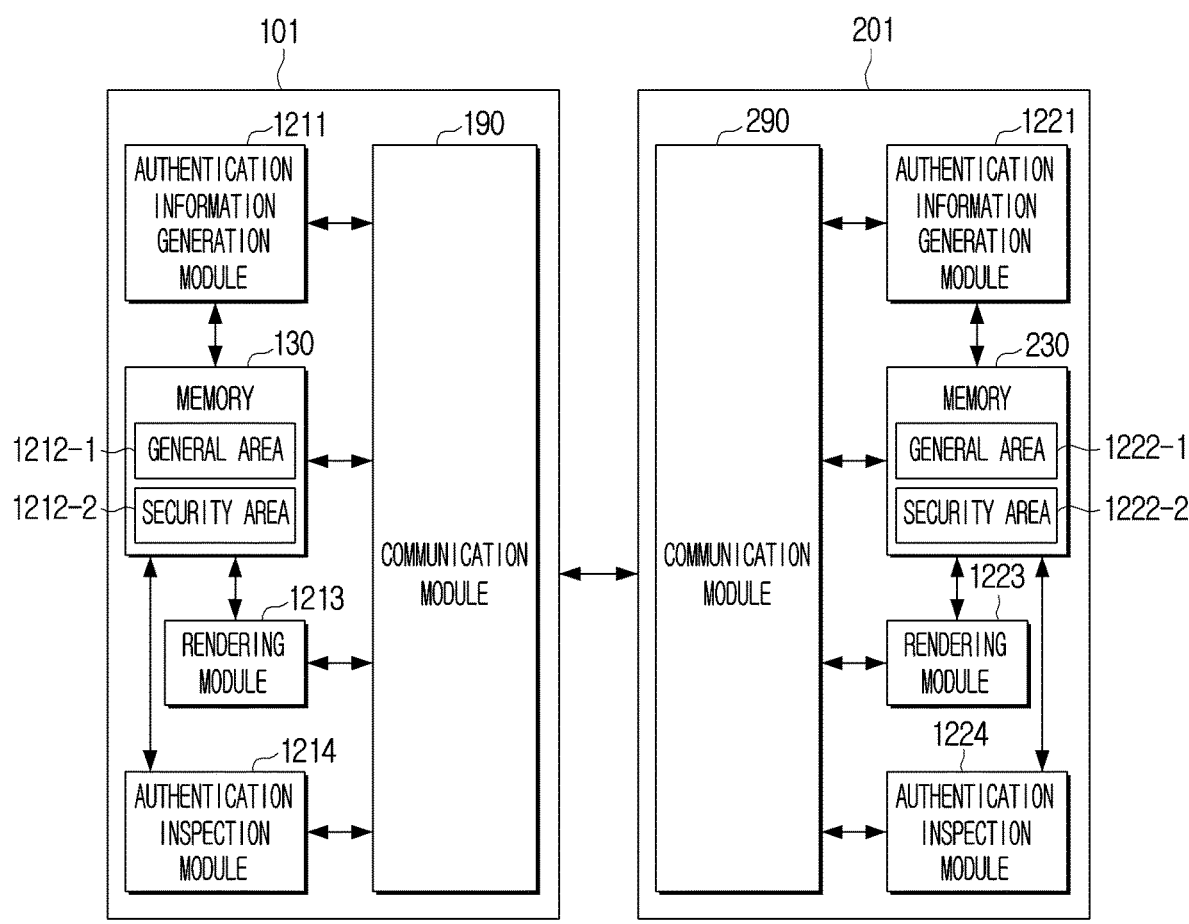
FIG. 12 is a diagram for illustrating a relation between various modules stored in an electronic device and an external device according to an embodiment of the disclosure.

FIG. 12 is a diagram for illustrating a relation between various modules stored in an electronic device and an external device according to an embodiment of the disclosure.

Referring to FIG. 12, the electronic device 101 may include a communication module 190, an authentication information generation module 1211, a memory 130, a rendering module 1213, and an authentication inspection module 1214. Also, the external device 201 may include a communication module 290, an authentication information generation module 1221, a memory 230, a rendering module 1223, and an authentication inspection module 1224.

Here, the communication modules 190, 290 may perform a function of transmitting or receiving various types of data between the electronic device 101 and the external device 201. Depending on implementation examples, the electronic device 101 and the external device 201 may transmit or receive various types of data through a separate external server, and the communication modules 190, 290 may perform a function of connecting to the external server.

Here, the authentication information generation modules 1211, 1221 may generate authentication information in each device. For example, the authentication information generation module 1211 generates first authentication information. Also, the authentication information generation module 1221 may generate second authentication information.

Here, the memory 130 may include a general area 1212-1 and a security area 1212-2, and the memory 230 may include a general area 1222-1 and a security area 1222-2. Here, the security areas 1212-2, 1222-2 may be safe areas (trust zones) wherein the generated authentication information or the received authentication information can be stored. For example, the security area 1212-2 stores the first authentication information generated in the electronic device 101 and store the second authentication information received from the external device 201. Also, the security area 1222-2 may store the second authentication information generated in the external device 201 and store the first authentication information received from the electronic device 101.

Here, the rendering modules 1213, 1223 may generate image data including authentication information. For example, the rendering module 1213 generates first image data including the second authentication information received from the external device 201. Also, the rendering module 1223 may generate second image data including the first authentication information received from the electronic device 101.

Here, the authentication inspection modules 1214, 1224 may identify authentication information in the received image data, and identify whether the identified authentication information coincides with prestored authentication information. For example, the authentication inspection module 1214 identifies authentication information in the second image data received from the external device 201, and identify whether the identified authentication information coincides with the first authentication information. Also, the authentication inspection module 1224 may identify authentication information in the first image data received from the electronic device 101, and identify whether the identified authentication information coincides with the second authentication information.

Meanwhile, only some components are described in FIG. 12, and additional other components of each device may be used in performing a video call service.

Figure 13:
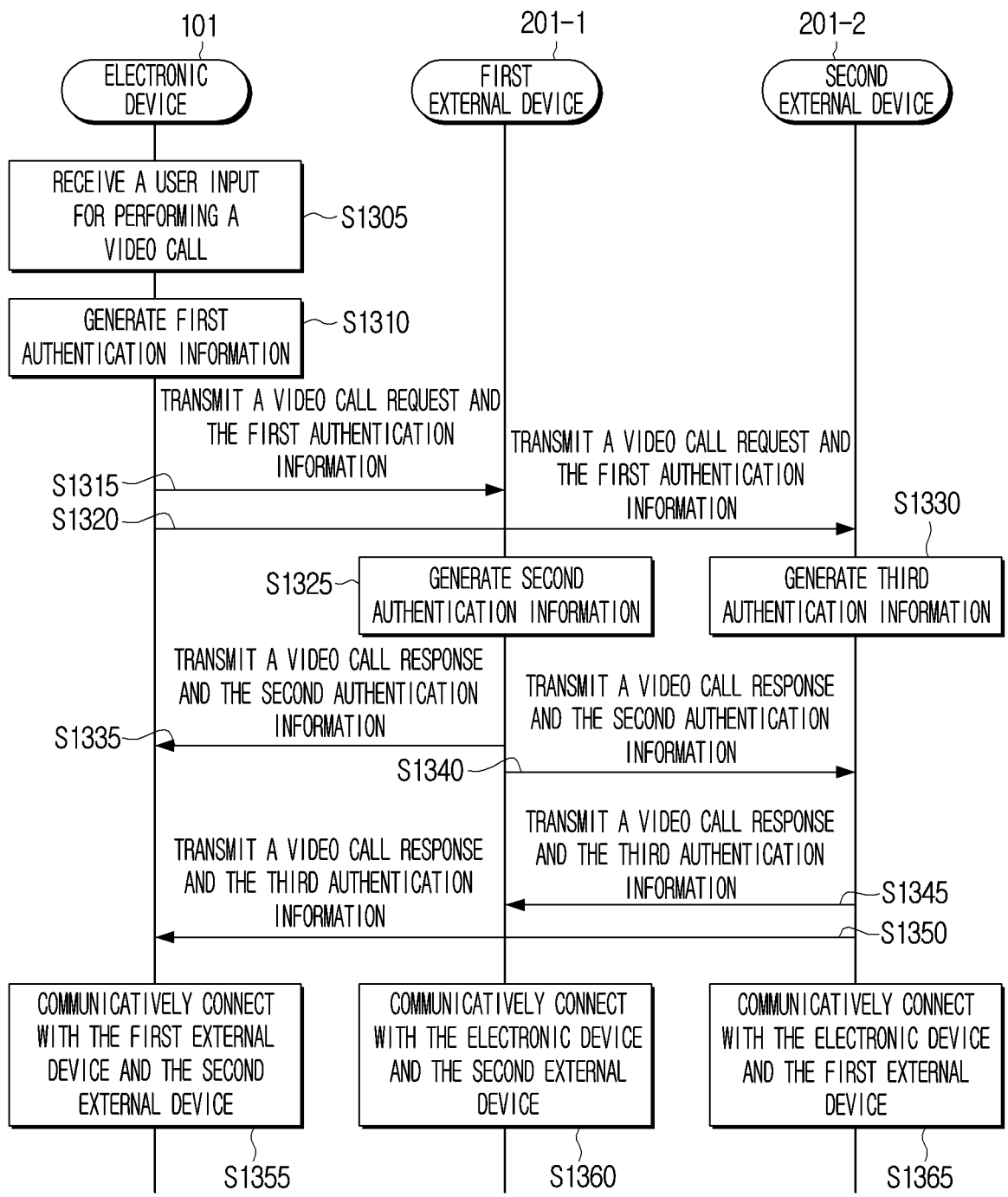
FIG. 13 is a flow chart for illustrating a video call performing operation according to an embodiment of the disclosure.

FIG. 13 is a flow chart for illustrating a video call performing operation according to an embodiment of the disclosure.

Referring to FIG. 13, an embodiment wherein the electronic device 101, the first external device 201-1, and the second external device 201-2 perform a video call is described. Here, the first external device 201-1 and the second external device 201-2 may correspond to the electronic device 102 or the electronic device 104 in FIG. 3.

The electronic device 101 may receive a user input for performing a video call in operation S1305. Then, the electronic device 101 may generate first authentication information in operation S1310. Then, the electronic device 101 may transmit a video call request and the first authentication information to the first external device 201-1 in operation S1315. Then, the electronic device 101 may transmit a video call request and the first authentication information to the second external electronic device 201-2 in operation S1320.

Here, when the video call request is received from the electronic device 101, the first external device 201-1 may generate second authentication information in operation S1325. Then, when the video call request is received from the electronic device 101, the second external electronic device 201-2 may generate third authentication information in operation S1330.

Here, the first external device 201-1 may transmit a video call response and the second authentication information to the electronic device 101 in operation S1335. Then, the first external device 201-1 may transmit a video call response and the second authentication information to the second external device 201-2 in operation S1340.

Here, the second external device 201-2 may transmit a video call response and the third authentication information to the first external device 201-1 in operation S1345. Then, the second external device 201-2 may transmit a video call response and the third authentication information to the electronic device 101 in operation S1350.

Here, when video call responses are received from each of the first external device 201-1 and the second external device 201-2, the electronic device 101 may perform communicative connection with the first external device 201-1 and the second external device 201-2 in operation S1355. Then, when the video call responses are received from each of the electronic device 101 and the second external device 201-2, the first external device 201-1 may perform communicative connection with the electronic device 101 and the second external device 201-2 in operation S1360. Then, when the video call responses are received from each of the electronic device 101 and the first external device 201-1, the second external device 201-2 may perform communicative connection with the electronic device 101 and the first external device 201-1 in operation S1365.

Figure 14:
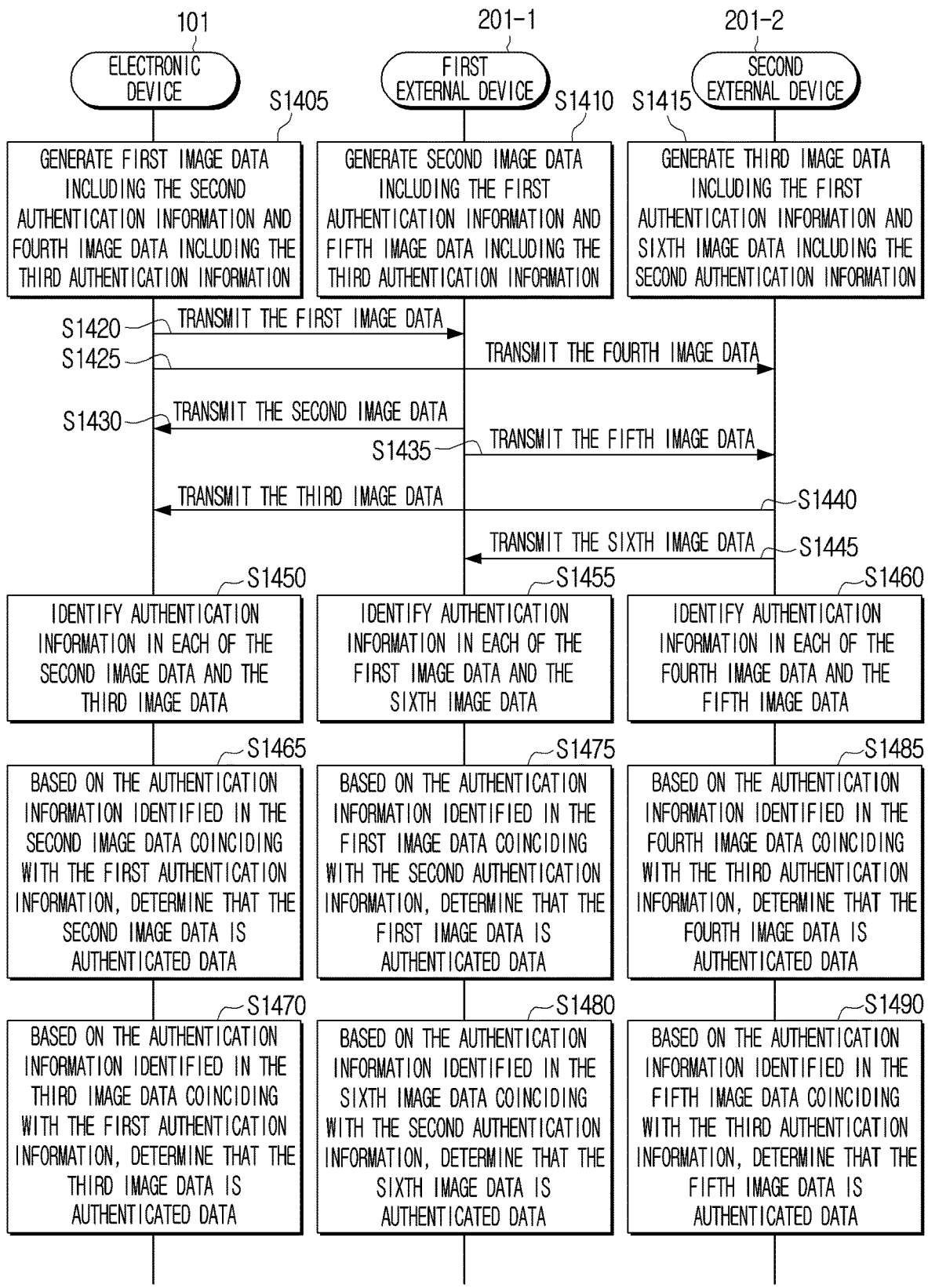
FIG. 14 is a diagram for illustrating operations after the operation in FIG. 13 according to an embodiment of the disclosure.

FIG. 14 is a diagram for illustrating operations after the operation in FIG. 13 according to an embodiment of the disclosure.

Referring to FIG. 14, operations after communicative connection among the electronic device 101, the first external device 201-1, and the second external device 201-2 was performed in the embodiment in FIG. 13 are described.

The electronic device 101 may generate first image data including the second authentication information, and generate fourth image data including the third authentication information in operation S1405. Then, the first external device 201-1 may generate second image data including the first authentication information and fifth image data including the third authentication information in operation S1410. Then, the second external device 201-2 may generate third image data including the first authentication information and sixth image data including the second authentication information in operation S1415.

Here, the electronic device 101 may transmit the first image data to the first external device 201-1 in operation S1420. Then, the electronic device 101 may transmit the fourth image data to the second external device 201-2 in operation S1425.

Here, the first external device 201-1 may transmit the second image data to the electronic device 101 in operation S1430. Then, the first external device 201-1 may transmit the fifth image data to the second external device 201-2 in operation S1435.

Here, the second external device 201-2 may transmit the third image data to the electronic device 101 in operation S1440. Then, the second external device 201-2 may transmit the sixth image data to the first external device 201-1 in operation S1445.

Here, the electronic device 101 may identify authentication information in each of the second image data and the third image data in operation S1450. Then, the first external device 201-1 may identify authentication information in each of the first image data and the sixth image data in operation S1455. Then, the second external device 201-2 may identify authentication information in each of the fourth image data and the fifth image data in operation S1460.

Here, if authentication information is not identified in the second image data or the third image data, the electronic device 101 may determine that the data wherein authentication information is not identified is unauthenticated data. Meanwhile, if the authentication information identified in the second image data coincides with the first authentication information, the electronic device 101 may determine that the second image data is authenticated data in operation S1465. Also, if the authentication information identified in the third image data coincides with the first authentication information, the electronic device 101 may determine that the third image data is authenticated data in operation S1470.

Here, if authentication information is not identified in the first image data or the sixth image data, the first external device 201-1 may determine that the data wherein authentication information is not identified is unauthenticated data. Meanwhile, if the authentication information identified in the first image data coincides with the second authentication information, the first external device 201-1 may determine that the first image data is authenticated data in operation S1475. Also, if the authentication information identified in the sixth image data coincides with the second authentication information, the first external device 201-1 may determine that the sixth image data is authenticated data in operation S1480.

Here, if authentication information is not identified in the fourth image data or the fifth image data, the second external device 201-2 may determine that the data wherein authentication information is not identified is unauthenticated data. Meanwhile, if the authentication information identified in the fourth image data coincides with the third authentication information, the second external device 201-2 may determine that the fourth image data is authenticated data in operation S1485. Also, if the authentication information identified in the fifth image data coincides with the third authentication information, the second external device 201-2 may determine that the fifth image data is authenticated data in operation S1490.

Figure 15:
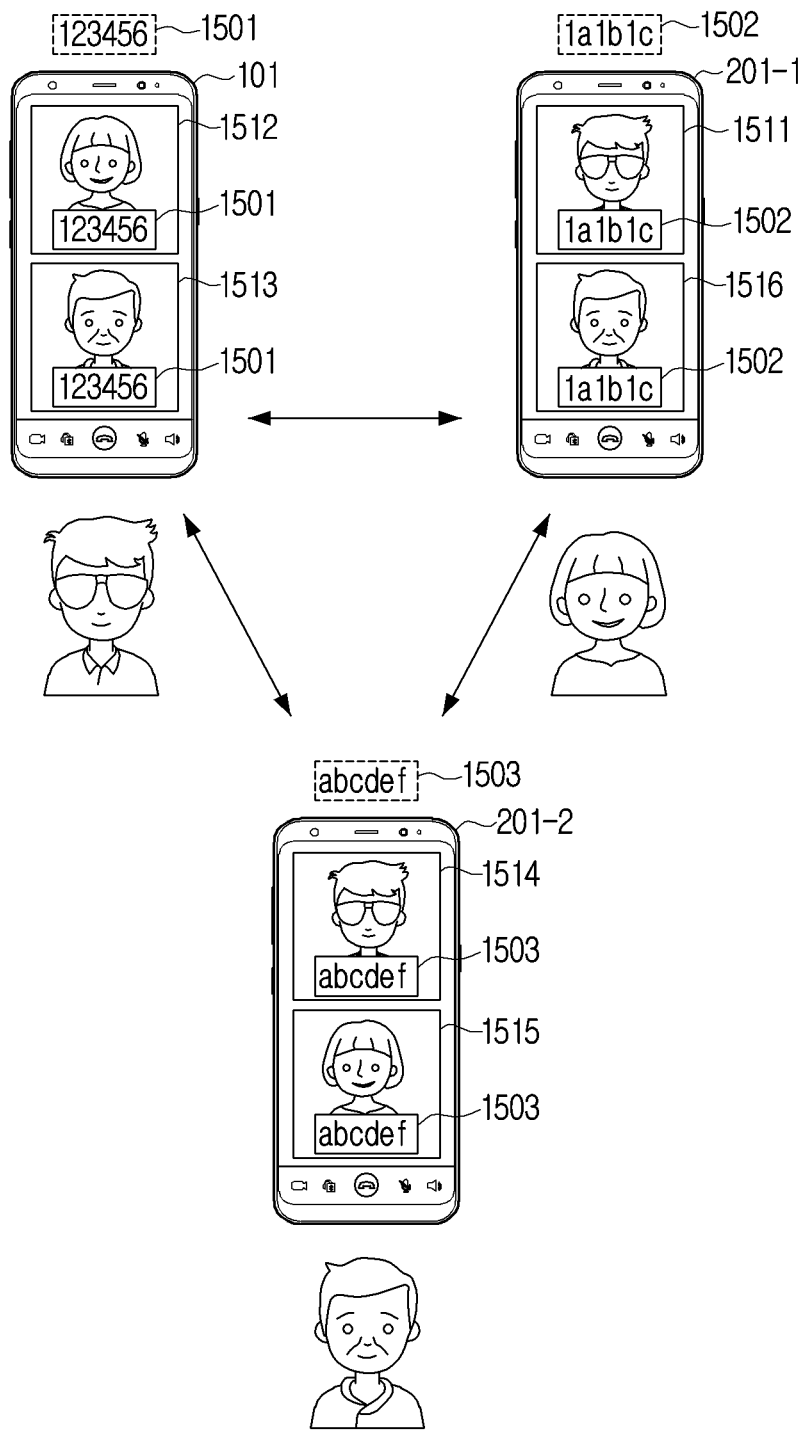
FIG. 15 is a diagram for illustrating the detailed operations in FIGS. 13 and 15 according to an embodiment of the disclosure.

FIG. 15 is a diagram for illustrating the detailed operations in FIGS. 13 and 15 according to an embodiment of the disclosure.

Referring to FIG. 15, the electronic device 101 may generate first authentication information 1501 ('123456'), the first external electronic device 201-1 may generate second authentication information 1502 ('1a1b1c'), and the second external electronic device 201-2 may generate third authentication information 1503 ('abcdef').

The electronic device 101 may generate first image data 1511 including the second authentication information 1502, and generate fourth image data 1514 including the third authentication information 1503. Also, the first external device 201-1 may generate second image data 1512 including the first authentication information 1501 and fifth image data 1515 including the third authentication information 1503. In addition, the second external device 201-2 may generate third image data 1513 including the first authentication information 1501 and sixth image data 1516 including the second authentication information 1502.

Here, the electronic device 101 may transmit the first image data 1511 to the first external device 201-1. Then, the electronic device 101 may transmit the fourth image data 1514 to the second external device 201-2.

Here, the first external device 201-1 may transmit the second image data 1512 to the electronic device 101. Then, the first external device 201-1 may transmit the fifth image data 1515 to the second external device 201-2.

Here, the second external device 201-2 may transmit the third image data 1513 to the electronic device 101. Then, the second external device 201-2 may transmit the sixth image data 1516 to the first external device 201-1.

Here, the electronic device 101 may display the second image data 1512 including the first authentication information 1501 and the third image data 1513 including the first authentication information 1501 on the display module 160 of the electronic device 101.

Here, the first external device 201-1 may display the first image data 1511 including the second authentication information 1502 and the sixth image data 1516 including the second authentication information 1502 on the display module of the first external device 201-1.

Here, the second external device 201-2 may display the fourth image data 1514 including the third authentication information 1503 and the fifth image data 1515 including the third authentication information 1503 on the display module of the second external device 201-2.

Figure 16:
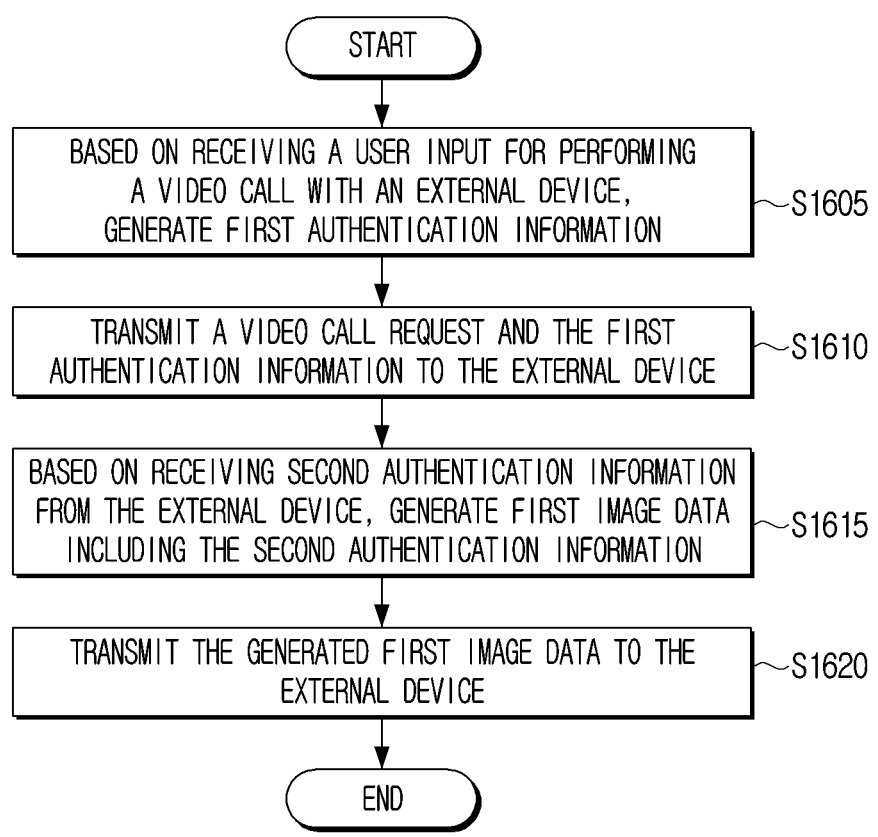
FIG. 16 is a diagram for illustrating a control method for an electronic device according to an embodiment of the disclosure.

FIG. 16 is a diagram for illustrating a control method for an electronic device according to an embodiment of the disclosure.

Referring to FIG. 16, a control method for the electronic device 101 according to an embodiment of the disclosure may include the steps of, based on receiving a user input for performing a video call with the external device 201, generating first authentication information in operation S1605, transmitting a video call request and the first authentication information to the external device 201 in operation S1610, and based on receiving second authentication information from the external device 201, generating first image data including the second authentication information in operation S1615, and transmitting the generated first image data to the external device 201 in operation S1620.

Meanwhile, the control method may further include the steps of, based on receiving second image data from the external device 201, identifying authentication information in the second image data, and based on the first authentication information and the authentication information identified in the second image data coinciding, determining that the second image data is authenticated data.

Meanwhile, in the step of generating the first image data in operation S1615, the first image data including the second authentication information may be generated by using a steganography method, and based on a predetermined event occurring, an algorithm by the steganography method may be changed.

Meanwhile, in the step of generating the first authentication information in operation S1605, the first authentication information may be generated based on time information and device identification information.

Meanwhile, the control method may further include the steps of, based on a predetermined event occurring, changing at least one of the time information or the device identification information and generating third authentication information, and transmitting the third authentication information instead of the first authentication information to the external device 201.

Meanwhile, the predetermined event may be an event that a predetermined cycle arrives or an event of receiving a user input for regenerating authentication information.

Meanwhile, in the step of generating the first image data in operation S1615, photographed image information may be acquired through the camera module 180 of the electronic device 101, and the first image data may be generated by combining the acquired photographed image information and the second authentication information.

Meanwhile, the control method may further include the steps of, based on receiving the user input for performing a video call with the external device 201, generating first audio data including the second authentication information, transmitting the generated first audio data to the external device 201, and based on receiving second audio data from the external device 201, identifying authentication information in the second audio data, and based on the first authentication information and the authentication information identified in the second audio data coinciding, determining that the second audio data is authenticated data.

Meanwhile, in the step of generating the first audio data, the first audio data including the second authentication information may be generated by using a non-audible frequency insertion method, and based on a predetermined event occurring, an algorithm by the non-audible frequency insertion method may be changed.

Meanwhile, in the step of generating the first audio data, voice audio information may be acquired through the audio module 170 of the electronic device 101, and the first audio data may be generated by combining the acquired voice audio information and the second authentication information.

Meanwhile, the control method for an electronic device as in FIG. 16 may be executed on an electronic device having the configuration as in FIG. 2 or 3, and may also be executed on electronic devices having other configurations.

Meanwhile, methods according to the aforementioned various embodiments of the disclosure may be implemented in forms of applications that can be installed on conventional electronic devices.

Also, the methods according to the aforementioned various embodiments of the disclosure may be implemented just with software upgrade, or hardware upgrade of conventional electronic devices.

In addition, the aforementioned various embodiments of the disclosure may be performed through an embedded server provided on an electronic device, or an external server of at least one of an electronic device or a display device.

Meanwhile, according to another embodiment of the disclosure, the aforementioned various embodiments may be implemented as software including instructions stored in machine-readable storage media, which can be read by machines (e.g.: computers). The machines refer to devices that call instructions stored in a storage medium, and can operate according to the called instructions, and the devices may include an electronic device according to the aforementioned embodiments. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to yet another embodiment of the disclosure, a method according to the aforementioned various embodiments may be provided while being included in a computer program product. The computer program product can be traded between a seller and a purchaser as a commodity. The computer program product may be distributed in the form of a machine-readable storage medium (e.g.: a compact disc read only memory (CD-ROM)), or distributed online through an application store (e.g.: PLAYSTORE™). In the case of online distribution, at least a portion of the computer program product may be at least temporarily stored in a storage medium such as the server of the manufacturer, the server of the application store, or the memory of the relay server, or temporarily generated.

In addition, each of the components (e.g.: a module or a program) according to the aforementioned various embodiments may be comprised of a single entity or a plurality of entities, and some sub-components among the aforementioned sub-components may be omitted, or different sub-components may be further included in the various embodiments. Alternatively or additionally, some components (e.g.: modules or programs) may be integrated into one entity to perform the same or similar functions performed by each component prior to integration. Operations performed by a module, a program, or another component, in accordance with the various embodiments, may be performed sequentially, in parallel, repetitively, or in a heuristic manner, or at least some operations may be performed in a different order or omitted, or a different operation may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
memory;
a camera;
a communication circuit; and
a processor, communicatively coupled to the memory, the camera, and the communication circuit,
wherein the processor is configured to:
based on receiving a user input for performing a video call with an external device, generate first authentication information and store the generated first authentication information in the memory, transmit a video call request and the first authentication information to the external device through the communication circuit, based on receiving second authentication information from the external device through the communication circuit, generate first image data including the second authentication information, and transmit the generated first image data to the external device through the communication circuit, wherein, to generate the first image data including the second authentication information, the processor is configured to:

receive an image captured by the camera, and modify the image captured by the camera based on the second authentication information.

2. The electronic device of claim 1, wherein the processor is further configured to:

based on receiving second image data from the external device through the communication circuit, identify authentication information in the second image data, and based on the first authentication information and the authentication information identified in the second image data coinciding, determine that the second image data is authenticated data.

3. The electronic device of claim 1, wherein the processor is further configured to:

generate the first image data including the second authentication information by using a steganography method, and based on a predetermined event occurring, change an algorithm by the steganography method.

4. The electronic device of claim 1, wherein the processor is further configured to:

generate the first authentication information based on time information and device identification information.

5. The electronic device of claim 4, wherein the processor is further configured to:

based on a predetermined event occurring:

generate third authentication information by changing at least one of the time information or the device identification information, store the generated third authentication information in the memory, and transmit the third authentication information instead of the first authentication information to the external device through the communication circuit.

6. The electronic device of claim 5, wherein the predetermined event is an event that a predetermined cycle arrives or an event of receiving a user input for regenerating authentication information.

7. The electronic device of claim 1, wherein the processor is further configured to:

based on receiving the user input for performing a video call with the external device, generate first audio data including the second authentication information, transmit the generated first audio data to the external device through the communication circuit, based on receiving second audio data from the external device through the communication circuit, identify authentication information in the second audio data, and based on the first authentication information and the authentication information identified in the second audio data coinciding, determine that the second audio data is authenticated data.

8. The electronic device of claim 7, wherein the processor is further configured to:

generate the first audio data including the second authentication information by using a non-audible frequency insertion method, and based on a predetermined event occurring, change an algorithm by the non-audible frequency insertion method.

9. The electronic device of claim 7, further comprising:

an audio circuit, wherein the processor is further configured to:

acquire voice audio information through the audio circuit, and generate the first audio data by combining the acquired voice audio information and the second authentication information.

10. A control method for performed by an electronic device, the control method comprising:

based on receiving a user input for performing a video call with an external device, generating first authentication information;

transmitting a video call request and the first authentication information to the external device;

based on receiving second authentication information from the external device, generating first image data including the second authentication information; and transmitting the generated first image data to the external device, wherein the generating of the first image data including the second authentication information comprises:

receiving an image captured by a camera of the electronic device: and modifying the image captured by the camera based on the second authentication information.

11. The control method of claim 10, further comprising:

based on receiving second image data from the external device, identifying authentication information in the second image data; and based on the first authentication information and the authentication information identified in the second image data coinciding, determining that the second image data is authenticated data.

12. The control method of claim 10, wherein the generating the first image data comprises:

generating the first image data including the second authentication information by using a steganography method; and based on a predetermined event occurring, changing an algorithm by the steganography method.

13. The control method of claim 10, wherein the generating the first authentication information comprises:

generating the first authentication information based on time information and device identification information.

14. The control method of claim 13, further comprising:

based on a predetermined event occurring:

generating third authentication information by changing at least one of the time information or the device identification information; and transmitting the third authentication information instead of the first authentication information to the external device.

* * * * *